(12) United States Patent
Tanimoto et al.

(10) Patent No.: US 11,634,890 B2
(45) Date of Patent: Apr. 25, 2023

(54) IMAGE DISPLAY SYSTEM FOR WORK MACHINE

(71) Applicants: Komatsu Ltd., Tokyo (JP); Osaka University, Suita (JP)

(72) Inventors: Takanobu Tanimoto, Osaka (JP); Yu Nanri, Osaka (JP); Yukinori Matsumura, Tokyo (JP); Kazuhisa Takahama, Tokyo (JP)

(73) Assignees: Komatsu Ltd., Tokyo (JP); Osaka University, Suita (JP)

( * ) Notice: Subject to any disclaimer, the term of this patent is extended or adjusted under 35 U.S.C. 154(b) by 177 days.

(21) Appl. No.: 16/315,737

(22) PCT Filed: Aug. 24, 2017

(86) PCT No.: PCT/JP2017/030415
§ 371 (c)(1),
(2) Date: Jan. 7, 2019

(87) PCT Pub. No.: WO2018/043301
PCT Pub. Date: Mar. 8, 2018

(65) Prior Publication Data
US 2019/0330825 A1  Oct. 31, 2019

(30) Foreign Application Priority Data
Sep. 2, 2016 (JP) .............................. JP2016-172229

(51) Int. Cl.
*E02F 9/26* (2006.01)
*B60K 35/00* (2006.01)
(Continued)

(52) U.S. Cl.
CPC ................ *E02F 9/26* (2013.01); *B60K 35/00* (2013.01); *E02F 9/261* (2013.01); *E02F 9/264* (2013.01);
(Continued)

(58) Field of Classification Search
CPC ... E02F 9/261; E02F 9/264; E02F 9/26; E02F 3/32; E02F 3/435; E02F 9/205;
(Continued)

(56) References Cited

U.S. PATENT DOCUMENTS 6,019,164 A    2/2000   Getchel et al.
6,375,176 B1   4/2002   Getchel et al.
(Continued)

FOREIGN PATENT DOCUMENTS

CN   104246085 A  * 12/2014  ............ E02F 9/2054
JP   H06-128987 A    5/1994
(Continued)

OTHER PUBLICATIONS

International Search Report dated Nov. 21, 2017, issued for PCT/JP2017/030415.
(Continued)

*Primary Examiner* — Maceeh Anwari
*Assistant Examiner* — Aarron E Santos
(74) *Attorney, Agent, or Firm* — Locke Lord LLP

(57) ABSTRACT

An image display system for a work machine including working equipment having a working tool and a turning body to which the working equipment is attached, includes: a position detector detecting at least one of an attitude and a position of the working equipment; a distance detector obtaining information on a distance from the work machine to a work target; and a processing device that generates, by using information on a position of the working tool obtained by the position detector and information on a position of the work target obtained from the information on the distance obtained by the distance detector, a first image including a portion corresponding to a part of the working tool and extending along a turning direction of the turning body, on
(Continued)

the work target opposed to the working tool, and displays the first image on the display device.

8 Claims, 13 Drawing Sheets

(51) Int. Cl.
  *B60R 1/00* (2022.01)
  *E02F 3/32* (2006.01)
(52) U.S. Cl.
  CPC .... *B60K 2370/152* (2019.05); *B60K 2370/16* (2019.05); *B60R 1/00* (2013.01); *B60R 2300/107* (2013.01); *B60R 2300/303* (2013.01); *E02F 3/32* (2013.01)
(58) Field of Classification Search
  CPC ... E02F 9/262; E02F 9/265; E02F 3/28; E02F 3/30; E02F 3/40; E02F 3/437; E02F 3/963; E02F 9/2033; E02F 9/2037; E02F 9/2045; E02F 9/2054; E02F 9/2285; E02F 9/2296; E02F 9/24; E02F 9/2833; B60K 2370/152; B60K 2370/16; B60K 2370/176; B60K 2370/177; B60K 2370/179; B60K 2370/31; B60K 35/00; B60R 1/00; B60R 1/002; B60R 11/04; B60R 2011/004; B60R 2300/107; B60R 2300/303; B60R 2300/306; B60R 2300/607
  See application file for complete search history.

(56) References Cited

U.S. PATENT DOCUMENTS

| | | | |
|---|---|---|---|
| 6,782,644 B2 * | 8/2004 | Fujishima | E02F 9/2296 37/348 |
| 9,764,428 B2 | 9/2017 | Hirata et al. | |
| 9,828,747 B2 | 11/2017 | Arimatsu et al. | |
| 10,017,919 B2 | 7/2018 | Nomura et al. | |
| 10,879,053 B2 | 12/2020 | Ricci et al. | |
| 2007/0283709 A1 | 12/2007 | Luse et al. | |
| 2008/0027591 A1 * | 1/2008 | Lenser | G05D 1/0251 701/2 |
| 2008/0133128 A1 * | 6/2008 | Koch | E02F 3/435 37/348 |
| 2008/0309784 A1 | 12/2008 | Asari et al. | |
| 2010/0220190 A1 * | 9/2010 | Hiroshi | B60R 1/00 348/148 |
| 2010/0259372 A1 * | 10/2010 | Hideshiro | H04N 7/181 340/435 |
| 2011/0297321 A1 | 12/2011 | Matsuda et al. | |
| 2013/0002877 A1 * | 1/2013 | Miyoshi | B60R 1/00 348/148 |
| 2013/0054075 A1 * | 2/2013 | Montgomery | E02F 9/262 701/25 |
| 2013/0182066 A1 * | 7/2013 | Ishimoto | E02F 9/261 348/38 |
| 2013/0222573 A1 * | 8/2013 | Onuma | H04N 7/18 348/82 |
| 2014/0099178 A1 * | 4/2014 | Nomura | E02F 9/26 414/685 |
| 2014/0293051 A1 | 10/2014 | Nakamura et al. | |
| 2014/0356985 A1 | 12/2014 | Ricci et al. | |
| 2015/0199847 A1 * | 7/2015 | Johnson | G02B 27/0093 345/633 |
| 2016/0024757 A1 | 1/2016 | Nomura et al. | |
| 2016/0076228 A1 * | 3/2016 | Nau | E02F 9/26 701/50 |
| 2016/0158892 A1 | 6/2016 | Hirata et al. | |
| 2016/0237654 A1 | 8/2016 | Arimatsu et al. | |
| 2018/0051446 A1 * | 2/2018 | Yoshinada | E02F 9/264 |
| 2019/0189491 A1 | 6/2019 | Akatsuka | |

FOREIGN PATENT DOCUMENTS

| | | | | |
|---|---|---|---|---|
| JP | 2001226986 A | * | 8/2001 | |
| JP | 2002-353298 A | | 12/2002 | |
| JP | 2003-508893 A | | 3/2003 | |
| JP | 2004104113 A | | 4/2004 | |
| JP | 2004-294067 A | | 10/2004 | |
| JP | 2005-188160 A | | 7/2005 | |
| JP | 2008-312004 A | | 12/2008 | |
| JP | 2009-540580 A | | 11/2009 | |
| JP | 2010-168635 A | | 8/2010 | |
| JP | 2013-055089 A | | 3/2013 | |
| JP | 2013113044 A | * | 6/2013 | |
| JP | 5426742 B1 | | 2/2014 | |
| JP | 2014-123228 A | | 7/2014 | |
| JP | 2014-205955 A | | 10/2014 | |
| JP | 2015-008287 A | | 1/2015 | |
| JP | 2016008484 A | * | 1/2016 | E02F 9/261 |
| JP | 5886962 B1 | | 3/2016 | |
| JP | 2016-056674 A | | 4/2016 | |
| JP | 2016-102312 A | | 6/2016 | |
| JP | 2016-111148 A | | 6/2016 | |
| JP | 2016102312 A | * | 6/2016 | G06T 19/00 |
| JP | 2016-160741 A | | 9/2016 | |
| JP | 6474905 B2 | * | 2/2019 | G06T 19/00 |
| WO | 2012/053105 A1 | | 4/2012 | |
| WO | 2012/157438 A1 | | 11/2012 | |
| WO | WO-2012157438 A1 | * | 11/2012 | B60R 11/04 |
| WO | WO-2017042873 A1 | * | 3/2017 | G06T 19/00 |
| WO | 2018/038044 A1 | | 3/2018 | |

OTHER PUBLICATIONS

Japanese Decision to Grant a Patent dated Jun. 15, 2021, issued in the corresponding Japanese patent application No. 2020-163375 and English translation thereof.

* cited by examiner

IMAGE DISPLAY SYSTEM FOR WORK MACHINE

FIELD

The present invention relates to an image display system for a work machine.

BACKGROUND

As described in Patent Literature 1, a technique of remotely operating a work machine such as an excavator or the like is known.

CITATION LIST

Patent Literature

Patent Literature 1: Japanese Patent Application Laid-Open No. 2004-294067 A

SUMMARY

Technical Problem

When a work machine is remotely operated, in the operation using the image of an operator's viewpoint of the work machine, since the image to be displayed is two-dimensional, a perspective feeling is poor. For this reason, it is difficult to grasp a distance between a work target and the work machine, and the work efficiency may decrease. Also, when an operator boarded on a work machine operates working equipment, depending on the level of skill of the operator, it may be difficult to grasp the distance between the working equipment and the work target, and the work efficiency may decrease.

An aspect of the present invention is to suppress a decrease in work efficiency when working with a work machine including working equipment having a working tool.

Solution to Problem

According to a first aspect of the present invention, an image display system for a work machine applied to a work machine including working equipment having a working tool and a turning body to which the working equipment is attached, the image display system comprises: a position detection unit that detects a position of the working equipment; a distance detection device that obtains information on a distance from the work machine to a work target; and a processing device that generates a first image by using information on a position of the working tool obtained by the position detection unit, and information on a position of the work target obtained from the information on the distance obtained by the distance detection device and causes a display device to display the first image, wherein the first image is generated based on information on a first position corresponding to the working tool on a surface of the work target opposed to the work tool and information on a position of a portion extending from the first position along a turning direction of the turning body.

According to a second aspect of the present invention, in the first aspect, wherein the first image is an image of an arc whose radius is a distance between a turning center axis of the turning body and the working tool as seen from a direction of the turning center axis and whose center is a position corresponding to the turning center axis.

According to a third aspect of the present invention, in the second aspect, wherein the working tool is a bucket and a part of the working tool is a blade edge of the bucket existing in a center in a width direction of the bucket.

According to a fourth aspect of the present invention, in any one of the first to third aspects, the processing device generates a line image along the surface of the work target by using the information on the position of the work target, combines the line image with an image of the work target, and displays the combined image on the display device.

According to the fifth aspect of the present invention, in the fourth aspect, wherein the line image includes a plurality of first line images radially extending from a position corresponding to a turning center axis of the turning body, and a plurality of second line images extending along a turning direction of the turning body around the turning center axis.

According to a sixth aspect of the present invention, the image display system for a work machine according to any one of the first to fifth aspects, further comprises: an imaging device attached to the turning body, wherein the processing device combines the first image and a second image that is an image of the work target imaged by the imaging device and displays the combined image on the display device.

According to a seventh aspect of the present invention, in the sixth aspect, wherein the processing device obtains an area occupied by the working equipment in the second image using the attitude of the working equipment and removes the obtained area from information on a shape of the work target.

According to an eighth aspect of the present invention, in the sixth or seventh aspect, wherein the imaging device, the position detection unit and the distance detection device are provided in the work machine, and the processing device and the display device are provided in a facility including an operation device that remotely operates the work machine.

According to a ninth aspect of the present invention, an image display system for a work machine applied to a work machine including working equipment having a working tool, a turning body to which the work equipment is attached, a position detection unit that detects a position of the working equipment, a distance detection device, and an imaging device, the image display system comprises: a display device; and a processing device that generates a first image by using information on a position of the working tool obtained by the position detection unit, and information on a position of a work target obtained from information on a distance which is obtained by the distance detection device and which is from the work machine to the work target, and combines the first image with a second image that is an image of the work target imaged by the imaging device, and causes the display device to display the combined image, wherein the first image is generated based on information on a first position corresponding to the working tool on a surface of the work target opposed to the work tool and information on a position of a portion extending from the first position along a turning direction of the turning body.

According to a tenth aspect of the present invention, there is provided a remote operation system for a work machine including an image display system for a work machine according to the ninth aspect and an operation device for operating the working equipment provided in the work machine.

According to an eleventh aspect of the present invention, there is provided a work machine including an image display system for a work machine according to any one of the first to ninth aspects.

According to a twelfth aspect of the present invention, there is provided a method for displaying an image of a work machine, the method being applied to a work machine including a working tool, working equipment having the working tool, a turning body to which the working equipment is attached, and an imaging device attached to the turning body, the method including: generating, using information on the position of the working tool obtained by using an attitude of the working equipment and information on the position of the work target obtained from information on a distance from the work machine to the work target, on a part of the working tool a first image based on information on a first position corresponding to a surface of the work target opposed to the working tool, and information on a position of a portion extending from the first position along a turning direction of the turning body; and causing a display device to display the generated first image, wherein the first image is generated based on the information on the first position corresponding to the working tool on the surface of the work target opposed to the working tool and the information on the position of the portion extending from the first position along the turning direction of the turning body.

Advantageous Effects of Invention

The present invention can suppress a decrease in work efficiency when working with a work machine including working equipment having a working tool.

DESCRIPTION OF EMBODIMENTS

Embodiments (embodiments) for carrying out the present invention will be described in detail with reference to the drawings.

<Outline of Image Display System of Work Machine and Remote Operation System of Work Machine>

Figure 1:
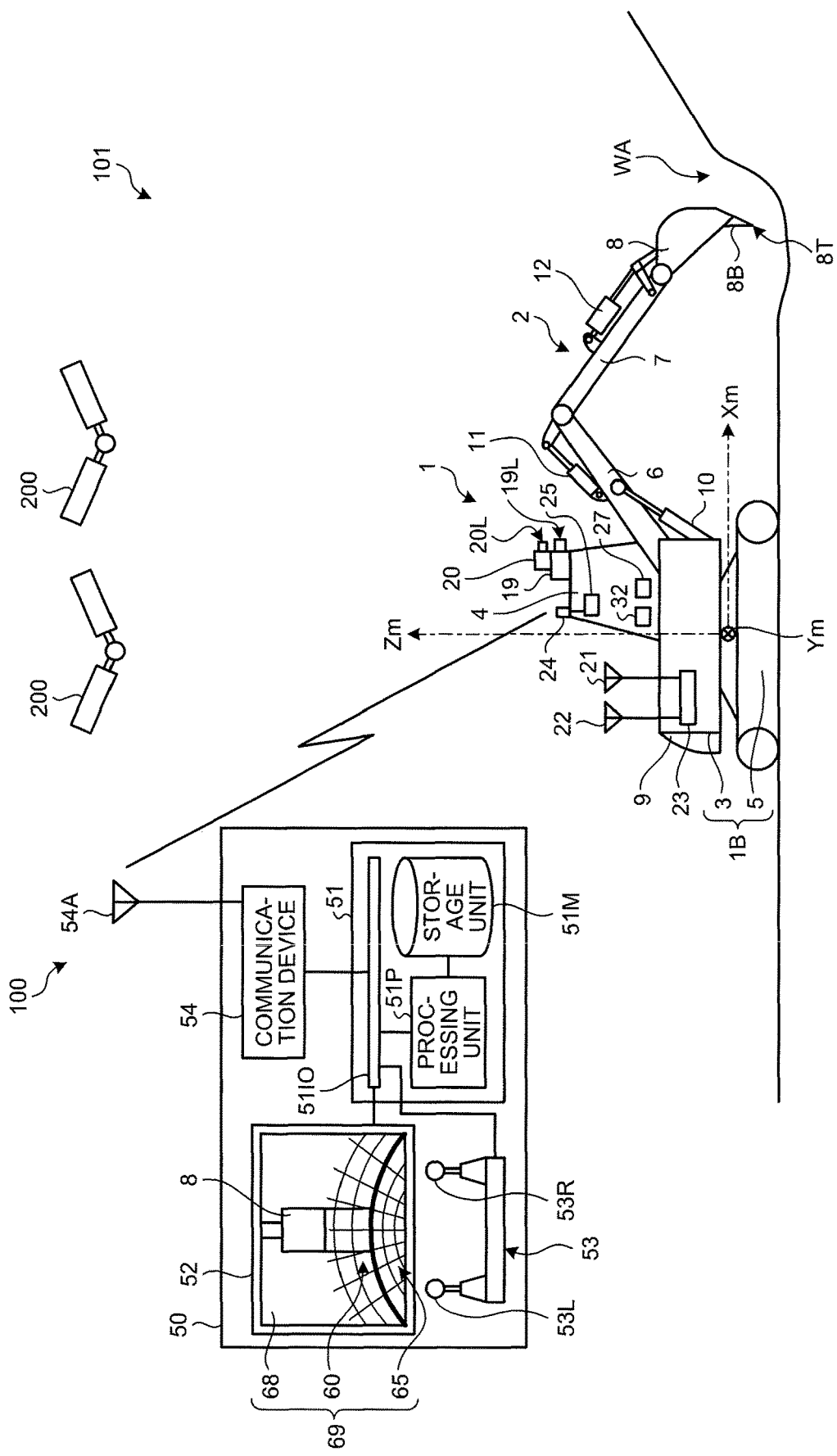
FIG. 1 is a diagram illustrating an image display system of a work machine and a remote operation system for a work machine according to an embodiment.

FIG. 1 is a diagram illustrating an image display system 100 of a work machine and a remote operation system 101 for a work machine according to an embodiment. When an operator remotely operates an excavator 1 which is a work machine, in the image display system 100 (hereinafter appropriately referred to as the image display system 100) for a work machine, a work target WA of the excavator 1 and a bucket 8 which is a working tool are imaged by an imaging device 19, and the obtained image is displayed on a display device 52. At this time, the image display system 100 displays, on the display device 52, a working image 69 including an image 60 for indicating a position of the bucket 8 on the work target WA, and an image 68 of the work target WA imaged by the imaging device 19. The image 68 also includes an image of the bucket 8. In the embodiment, the working image 69 further includes a reference image 65. The reference image 65 is an image displayed along the surface of the work target WA. The reference image 65 is an index representing the position of the work target WA. The work target of the excavator 1 is a topography surface to be worked by working equipment 2 of the excavator 1, that is, the work target WA.

The image display system 100 includes an imaging device 19, an attitude detection device 32, a distance detection device 20, and a processing device 51. The remote operation system 101 of the work machine (hereinafter appropriately referred to as the remote operation system 101) includes the imaging device 19, the attitude detection device 32, the distance detection device 20, a working equipment control device 27, the display device 52, the processing device 51, and an operation device 53. In the embodiment, the imaging device 19, the attitude detection device 32, and the distance detection device 20 of the image display system 100 are provided in the excavator 1, and the processing device 51 is provided in a facility 50. The facility 50 is used for remotely controlling the excavator 1 and managing the excavator 1. In an embodiment, the imaging device 19, the attitude detection device 32, the distance detection device 20, and the working equipment control device 27 of the remote operation system 101 are provided in the excavator 1, and the display device 52, the processing device 51, and the operation device 53 are provided in the facility 50.

The processing device 51 of the image display system 100 includes a processing unit 51P, a storage unit 51M, and an input/output unit 51IO. The processing unit 51P is exemplified by a processor such as a central processing unit (CPU). The storage unit 51M is exemplified by, for example, a random access memory (RAM), a read only memory (ROM), a hard disk drive, a storage device, or a combination thereof. The input/output unit 51IO is an interface circuit for connecting the processing device 51 and an external device. In the embodiment, the display device 52, the operation device 53, and a communication device 54 are connected to the input/output unit 51IO as external devices. The external devices connected to the input/output unit 51IO are not limited to these.

By using information on the position of the bucket 8 obtained by using the attitude of the working equipment 2 and information on the position of the work target WA obtained from the information on the distance obtained by the distance detection device 20, the processing device 51 generates, with reference to the imaging device 19, the first image to be generated based on information on a first position corresponding to the bucket 8 on the work target WA opposed to the bucket 8, and information on the position of a portion extending from the first position along a direction in which an upper turning body 3, which is a turning body, turns. The first position may be a position corresponding to a part of the bucket 8 on the work target WA opposed to the bucket 8. The processing device 51 combines the first image with the image 68 of the work target WA imaged by the imaging device 19 and causes the display device 52 to display the combined image. The work target WA is a surface on which the working equipment 2 of the excavator 1 performs work such as excavation or earthmoving. The first image is included in the image 60 for indicating the position of the bucket 8 on the work target WA. Hereinafter, the image 68 is appropriately referred to as a second image 68.

The display device 52 is exemplified by a liquid crystal display or a projector, but the present invention is not limited thereto. The communication device 54 includes an antenna 54A. The communication device 54 communicates with a communication device 25 provided in the excavator 1 to acquire information on the excavator 1 and to transmit information to the excavator 1.

The operation device 53 has a left operation lever 53L installed on the left side of an operator and a right operation lever 53R arranged on the right side of the operator. The left operation lever 53L and the right operation lever 53R correspond to the operation of two axes in the front, rear, left and right operations. For example, the operation in the front-rear direction of the right operation lever 53R corresponds to the operation of a boom 6 of the working equipment 2 provided in the excavator 1. The operation in the horizontal direction of the right operation lever 53R corresponds to the operation of the bucket 8 of the working equipment 2. The operation in the front-rear direction of the left operation lever 53L corresponds to the operation of an arm 7 of the working equipment 2. The operation of the left operation lever 53L in the horizontal direction corresponds to the turning of the upper turning body 3 of the excavator 1.

The operation amounts of the left operation lever 53L and the right operation lever 53R are detected by, for example, a potentiometer and a Hall IC or the like. The processing device 51 generates a control signal for controlling an electromagnetic control valve based on these detection values. This signal is sent to the working equipment control device 27 via the communication device 54 of the facility 50 and the communication device 25 of the excavator 1. The working equipment control device 27 controls the working equipment 2 by controlling the electromagnetic control valve based on the control signal. The electromagnetic control valve will be described later.

The processing device 51 acquires an input to at least one of the left operation lever 53L and the right operation lever 53R and generates an instruction to operate at least one of the working equipment 2 and the upper turning body 3. The processing device 51 transmits the generated instruction to the communication device 25 of the excavator 1 via the communication device 54. The working equipment control device 27 included in the excavator 1 acquires an instruction from the processing device 51 via the communication device 25 and operates at least one of the working equipment 2 and the upper turning body 3 according to the instruction.

The excavator 1 includes the communication device 25, the working equipment control device 27, the attitude detection device 32, the imaging device 19, the distance detection device 20, antennas 21 and 22, and a position computing device 23. The working equipment control device 27 controls the working equipment 2. The communication device 25 is connected to an antenna 24 and communicates with the communication device 54 provided in the facility 50. The working equipment control device 27 controls the working equipment 2 and the upper turning body 3. The attitude detection device 32 detects the attitude of at least one of the working equipment 2 and the excavator 1. The imaging device 19 is attached to the excavator 1 and images the work target WA. The distance detection device 20 obtains information on the distance from a predetermined position of the excavator 1 to the work target WA. The antennas 21 and 22 receive radio waves from a positioning satellite 200. Using the radio waves received by the antennas 21 and 22, the position computing device 23 obtains a global position of the antennas 21 and 22, that is, a position in a global coordinate system.

<Overall Configuration of Excavator 1>

The excavator 1 has a vehicle body 1B as a body portion and the working equipment 2. The vehicle body 1B includes the upper turning body 3 and a traveling device 5 that is a traveling body. The upper turning body 3 has a cab 4. The traveling device 5 mounts the upper turning body 3. The traveling device 5 has a crawler belt. The traveling device 5 causes the excavator 1 to travel as the crawler belt rotates. The working equipment 2 is attached to a lateral side of the cab 4 of the upper turning body 3.

In the upper turning body 3, a side where the working equipment 2 and the cab 4 are disposed is a front, and a side where a counter weight 9 is disposed is a rear. The left side facing forward is the left side of the upper turning body 3 and the right side facing forward is the right side of the upper turning body 3. In the excavator 1 or the vehicle body 1B, a side of the traveling device 5 is a lower side with the upper turning body 3 as a reference, and a side of the upper turning body 3 is an upper side with the traveling device 5 as a reference. When the excavator 1 is installed on a horizontal plane, the lower side is a vertical direction, that is, the side of action direction of gravity, and the upper side is the opposite side to the vertical direction.

The working equipment 2 has the boom 6, the arm 7, the bucket 8 as a working tool, a boom cylinder 10, an arm cylinder 11, and a bucket cylinder 12. The bucket 8 has a plurality of blades 8B. A cutting edge 8T is a tip of the blade 8B. The bucket 8 is not limited to one having a plurality of blades 8B. The bucket 8 may be a tilt bucket. Besides this, instead of the bucket 8, the working equipment 2 may be provided with a rock drilling attachment or the like having a faced bucket or a rock drilling tip as a working tool.

Each of the boom cylinder 10, the arm cylinder 11, and the bucket cylinder 12 is a hydraulic cylinder driven by the pressure of hydraulic fluid discharged from a hydraulic pump. The boom cylinder 10 drives the boom 6. The arm cylinder 11 drives the arm 7. The bucket cylinder 12 drives the bucket 8.

The antennas 21 and 22 and the antenna 24 are attached to the upper part of the upper turning body 3. The antennas 21 and 22 are used for detecting the position of the excavator 1. The antennas 21 and 22 are electrically connected to the position computing device 23.

The antennas 21 and 22 are antennas for a kinematic-global navigation satellite systems (GNSS). The antennas 21 and 22 are disposed apart from each other by a predetermined distance along a direction parallel to the width direction of the upper turning body 3. The antennas 21 and 22 receive GNSS radio waves from the positioning satellite 200 and output signals corresponding to the received GNSS radio waves. The antennas 21 and 22 may be antennas for a global positioning system (GPS). In the following description, the antennas 21 and 22 will be referred to as GNSS antennas 21 and 22 as appropriate. The position computing device 23 detects the position of the excavator 1 using, for example, GNSS.

Since the imaging device 19 takes an image of the work target WA illustrated in FIG. 1, and the distance detection device 20 obtains the distance from itself (predetermined position of the excavator 1) to the work target WA, it is preferable to acquire information from the work target WA as wide as possible. Therefore, in the embodiment, the antenna 24, the imaging device 19, and the distance detection device 20 are installed above the cab 4 of the upper turning body 3. A place where the imaging device 19 and the distance detection device 20 are installed is not limited to the upper side of the cab 4. For example, the imaging device 19 and the distance detection device 20 may be installed inside and above the cab 4.

In the imaging device 19, an incident surface 19L faces the front of the upper turning body 3. In the distance detection device 20, an incidence surface 20L faces the front of the upper turning body 3. In the embodiment, the imaging device 19 is a monocular camera equipped with an image sensor such as a charge coupled device (CCD) image sensor or a complementary metal oxide semiconductor (CMOS) image sensor. In the embodiment, the distance detection device 20 is a three-dimensional laser range finder or a distance sensor. The imaging device 19 and the distance detection device 20 are not limited thereto. For example, instead of the imaging device 19 and the distance detection device 20, a device having a function of acquiring an image of the work target WA and a function of obtaining the distance to the work target WA may be used. As such a device, for example, a stereo camera is exemplified.

<Control System of Excavator 1>

Figure 2:
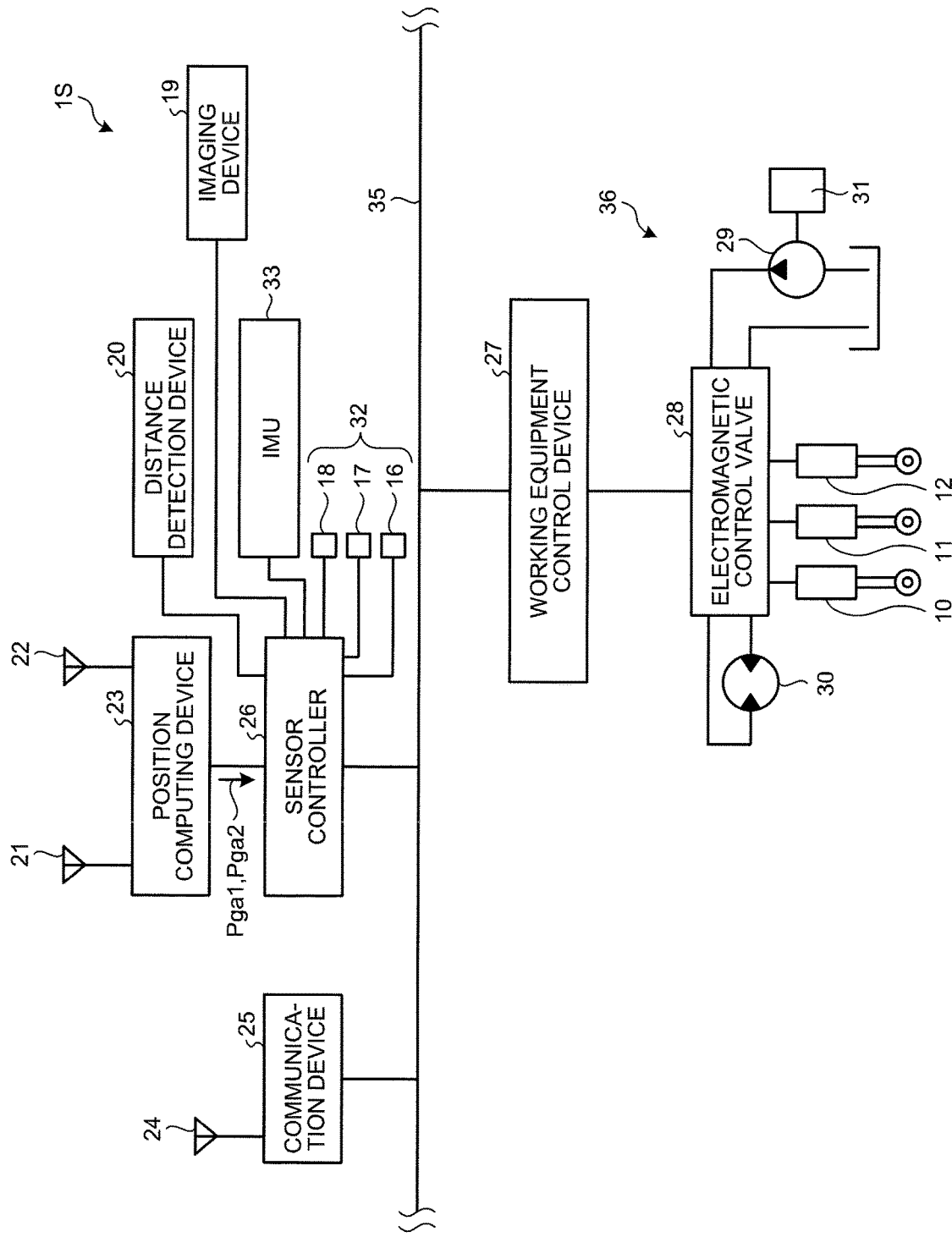
FIG. 2 is a diagram illustrating a control system of an excavator which is the work machine according to the embodiment.

FIG. 2 is a diagram illustrating a control system 1S of the excavator 1 which is the work machine according to the embodiment. The control system 1S includes the communication device 25, a sensor controller 26, the working equipment control device 27, the imaging device 19, the distance detection device 20, the position computing device 23, the attitude detection device 32, an inertial measurement unit (IMU) 33, and a hydraulic system 36. The communication device 25, the sensor controller 26, and the working equipment control device 27 are connected by a signal line 35. With such a structure, the communication device 25, the sensor controller 26, and the working equipment control device 27 can mutually exchange information via the signal line 35. As a signal line for transmitting information in the control system 1S, an in-vehicle signal line such as a controller area network (CAN) is exemplified.

The sensor controller 26 has a processor such as a CPU and a storage device such as a RAM and a ROM. The sensor controller 26 receives the detection value of the position computing device 23, the information on the image imaged by the imaging device 19, the detection value of the distance detection device 20, the detection value of the attitude detection device 32, and the detection value of the IMU 33. The sensor controller 26 transmits the input detection value and image information to the processing device 51 of the facility 50 illustrated in FIG. 1 via the signal line 35 and the communication device 25.

The working equipment control device 27 has a processor such as a CPU and a storage device such as a RAM and a ROM. The working equipment control device 27 acquires an instruction generated by the processing device 51 of the facility 50 to operate at least one of the working equipment 2 and the upper turning body 3 via the communication device 25. The working equipment control device 27 controls an electromagnetic control valve 28 of the hydraulic system 36 based on the acquired instruction.

The hydraulic system 36 includes the electromagnetic control valve 28, a hydraulic pump 29, hydraulic actuators such as the boom cylinder 10, the arm cylinder 11, the bucket cylinder 12 and a turning motor 30. The hydraulic pump 29 is driven by the engine 31 and discharges hydraulic oil for operating the hydraulic actuator. The working equipment control device 27 controls the electromagnetic control valve 28 to control the flow rate of the hydraulic fluid supplied to the boom cylinder 10, the arm cylinder 11, the bucket cylinder 12, and the turning motor 30. In this way, the working equipment control device 27 controls the operations of the boom cylinder 10, the arm cylinder 11, the bucket cylinder 12, and the turning motor 30.

The sensor controller 26 acquires the detection values of a first stroke sensor 16, a second stroke sensor 17, and a third stroke sensor 18. The first stroke sensor 16 is provided in the boom cylinder 10, the second stroke sensor 17 is provided in the arm cylinder 11, and the third stroke sensor 18 is provided in the bucket cylinder 12.

The first stroke sensor 16 detects a boom cylinder length, which is the length of the boom cylinder 10, and outputs the boom cylinder length to the sensor controller 26. The second stroke sensor 17 detects an arm cylinder length, which is the length of the arm cylinder 11, and outputs the arm cylinder length to the sensor controller 26. The third stroke sensor 18 detects a bucket cylinder length, which is the length of the bucket cylinder 12, and outputs the bucket cylinder length to the sensor controller 26.

When the boom cylinder length, the arm cylinder length and the bucket cylinder length are determined, the attitude of the working equipment 2 is determined. Therefore, the first stroke sensor 16, the second stroke sensor 17, and the third stroke sensor 18 that detect the boom cylinder length, the arm cylinder length and the bucket cylinder length are equivalent to the attitude detection device 32 that detects the attitude of the working equipment 2. The attitude detection device 32 is not limited to the first stroke sensor 16, the second stroke sensor 17, and the third stroke sensor 18, but may be an angle detector.

Based on the boom cylinder length detected by the first stroke sensor 16, the sensor controller 26 calculates the inclination angle of the boom 6 with respect to a direction orthogonal to the horizontal plane in a vehicle body coordinate system which is the coordinate system of the excavator 1. The sensor controller 26 calculates the inclination angle of the arm 7 with respect to the boom 6 from the arm cylinder length detected by the second stroke sensor 17. The sensor controller 26 calculates the inclination angle of the bucket 8 with respect to the arm 7 from the bucket cylinder length detected by the third stroke sensor 18. The inclination angles of the boom 6, the arm 7 and the bucket 8 are information indicating the attitude of the working equipment 2. That is, the sensor controller 26 obtains information indicating the attitude of the working equipment 2. The sensor controller 26 transmits the calculated inclination angle to the processing device 51 of the facility 50 illustrated in FIG. 1 via the signal line 35 and the communication device 25.

The position computing device 23 includes a processor such as a CPU and a storage device such as a RAM and a ROM. The position computing device 23 obtains the position of the excavator 1. Specifically, the position computing device 23 detects the position of the antennas 21 and 22 and the orientation of the upper turning body 3 in the global coordinate system using the signals acquired from the antennas 21 and 22, and outputs the detected positions and the orientation. The orientation of the upper turning body 3 represents the orientation of the upper turning body 3 in the global coordinate system. The orientation of the upper turning body 3 can be expressed by, for example, an orientation of the front-rear direction of the upper turning body 3 about the vertical axis of the global coordinate system. An azimuth angle is a rotation angle around the vertical axis of the global coordinate system of the reference axis in the front-rear direction of the upper turning body 3. An azimuth of the upper turning body 3 is represented by the azimuth angle.

The IMU 33 detects the operation and attitude of the excavator 1. The operation of the excavator 1 includes at least one of an operation of the upper turning body 3 and an operation of the traveling device 5. The attitude of the hydraulic excavator 1 is represented by a roll angle, a pitch angle and a yaw angle of the excavator 1. In the embodiment, the IMU 33 detects and outputs the angle or angular velocity and the acceleration of the excavator 1. The angle of the excavator 1 detected by the IMU 33 is a roll angle, a pitch angle and a yaw angle of the excavator 1.

<About Coordinate System>

Figure 3:
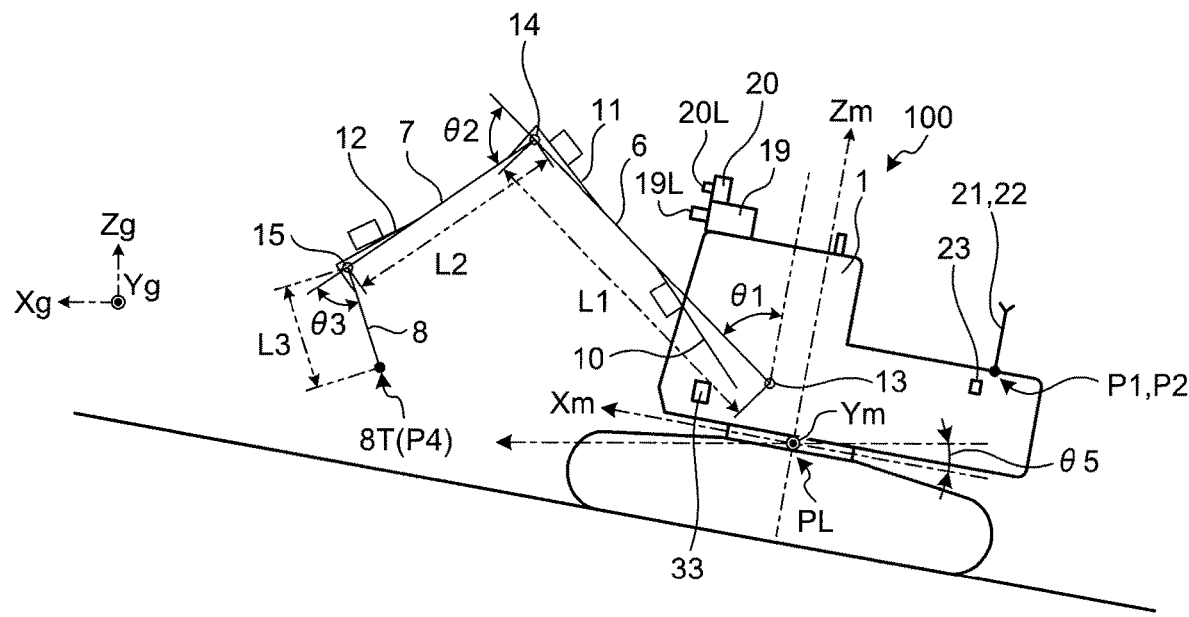
FIG. 3 is a view for explaining a coordinate system of the image display system and the remote operation system according to the embodiment.
Figure 4:
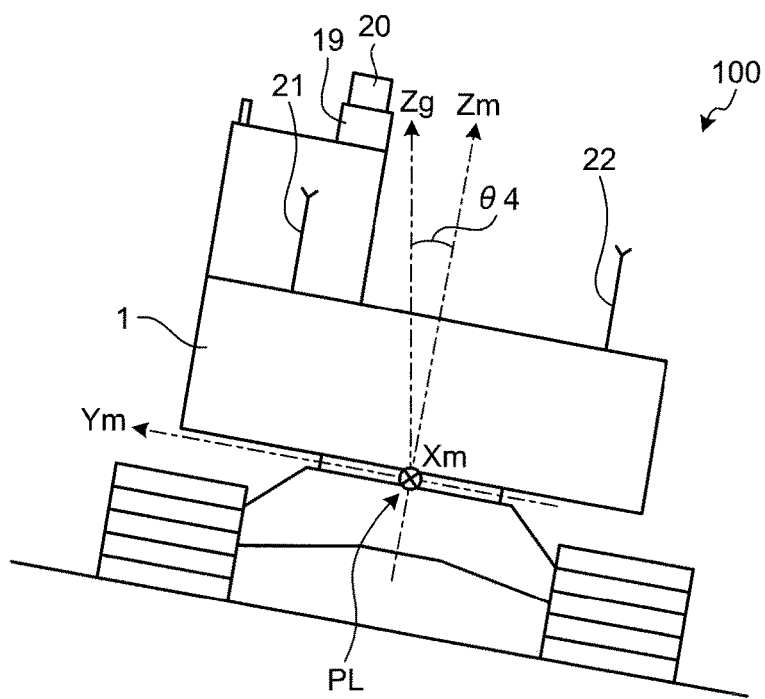
FIG. 4 is a rear view of the excavator.
Figure 5:
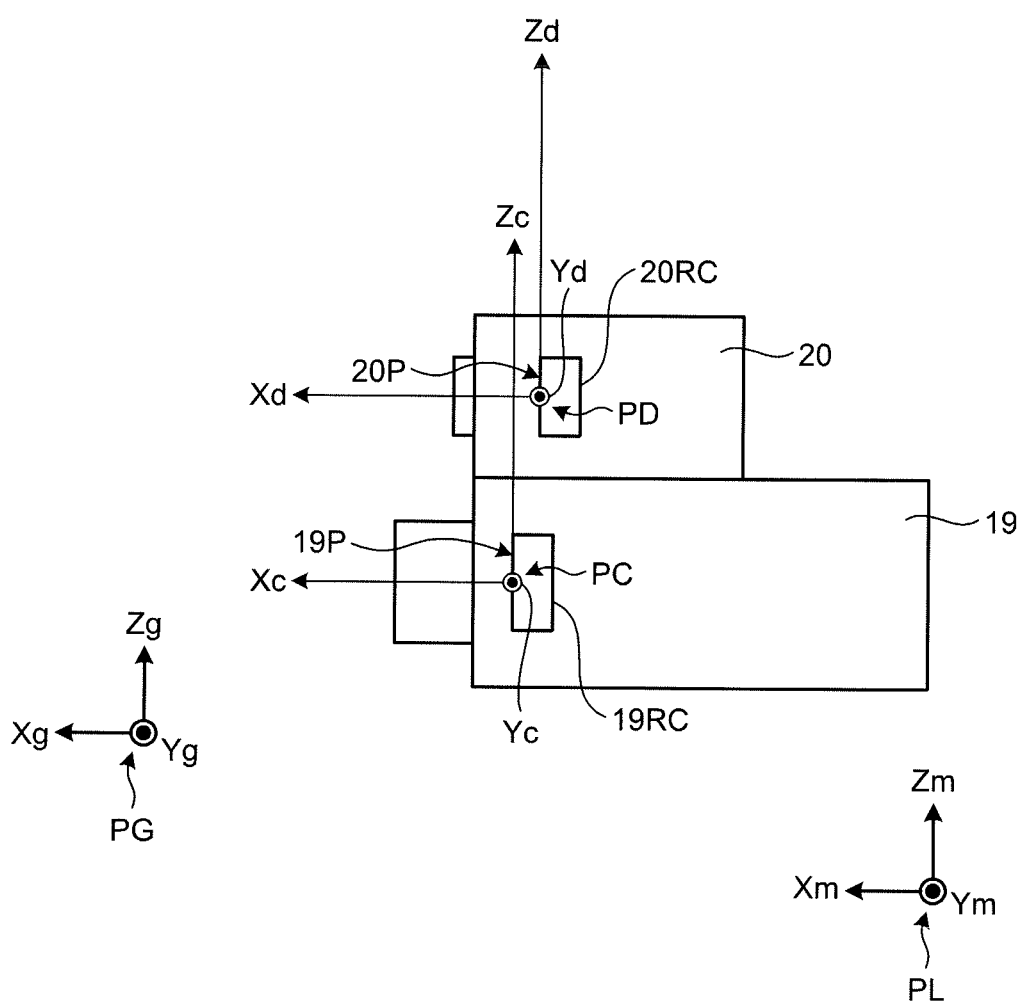
FIG. 5 is a diagram for explaining a coordinate system of an imaging device and a distance detection device.

FIG. 3 is a view for explaining a coordinate system of the image display system 100 and the remote operation system 101 according to the embodiment. FIG. 4 is a rear view of the excavator 1. FIG. 5 is a diagram for explaining a coordinate system of the imaging device 19 and the distance detection device 20.

In the image display system 100 and the remote operation system 101, there are a global coordinate system, a vehicle body coordinate system, the coordinate system of the imaging device 19, and the coordinate system of the distance detection device 20. The global coordinate system (Xg, Yg, Zg) is a three-dimensional coordinate system with reference to an origin PG fixed to the earth as a reference. In an embodiment, the global coordinate system is, for example, a coordinate system in GNSS or GPS.

The vehicle body coordinate system is a three-dimensional coordinate system indicated by (Xm, Ym, Zm) with reference to the excavator 1. In the embodiment, an origin position PL of the vehicle body coordinate system is an intersection point of the Zm axis which is the rotation center axis of the upper turning body 3 and a plane orthogonal to the Zm axis in a swing circle of the upper turning body 3, but it is not limited thereto. The Xm axis is an axis extending in the front-rear direction of the upper turning body 3 and orthogonal to the Zm axis. The Xm axis is a reference axis in the front-rear direction of the upper turning body 3. The Ym axis is an axis that is orthogonal to the Zm axis and the Xm axis and that extends in the width direction of the upper turning body 3. A plane orthogonal to the Zm axis in the swing circle can be a plane passing through the center in the Zm axis direction of the swing circle.

In the embodiment, as illustrated in FIG. 5, the coordinate system of the imaging device 19 (hereinafter appropriately referred to as an imaging device coordinate system) is a three-dimensional coordinate system indicated by (Xc, Yc, Zc) where the center of an imaging surface 19P of an imaging element 19RC is an origin PC. The Xc axis of the imaging device coordinate system (Xc, Yc, Zc) is an axis passing through the optical center of the imaging device 19 and extending in a direction orthogonal to the imaging surface 19P. The Yc axis is an axis orthogonal to the Xc axis. The Zc axis is an axis orthogonal to both Xc axis and Yc axis.

In the embodiment, as illustrated in FIG. 5, the coordinate system of the distance detection device 20 is a three-dimensional coordinate system indicated by (Xd, Yd, Zd) with the center of a detection surface 20P of a distance detection element 20RC as an origin PD.

<Attitude of Excavator 1>

As illustrated in FIG. 4, an inclination angle $\theta 4$ with respect to the horizontal direction of the upper turning body 3, that is, the width direction is a roll angle of the excavator 1, an inclination angle $\theta 5$ of the upper turning body 3 with respect to the front-back direction is a pitch angle of the excavator 1, and the angle of the upper turning body 3 about the vertical axis is a yaw angle of the excavator 1. The roll angle, the pitch angle and the yaw angle are obtained by integrating the angular velocity detected by the IMU 33 with time.

The acceleration and angular velocity detected by the IMU 33 are output to the sensor controller 26 as operation information. The sensor controller 26 performs processing such as filtering and integration on motion information acquired from the IMU 33 to obtain the inclination angle $\theta 4$ which is a roll angle, the inclination angle $\theta 5$ which is a pitch angle, and the yaw angle. The sensor controller 26 transmits the obtained inclination angle $\theta 4$, inclination angle $\theta 5$ and yaw angle via the signal line 35 and the communication device 25 illustrated in FIG. 2 to the processing device 51 of the facility 50 illustrated in FIG. 1 as information relating to the attitude of the excavator 1.

As described above, the sensor controller 26 obtains information indicating the attitude of the working equipment 2. Specifically, the information indicating the attitude of the working equipment 2 is an inclination angle $\theta 1$ of the boom 6 with respect to a direction orthogonal to a horizontal plane in the vehicle body coordinate system (Zm axis direction), an inclination angle $\theta 2$ of the arm 7 with respect to the boom 6, and an inclination angle $\theta 3$ of the bucket 8 with respect to the arm 7. The processing device 51 of the facility 50 illustrated in FIG. 1 calculates the position P4 of the cutting edge 8T (hereinafter appropriately referred to as a cutting edge position) of the bucket 8 from the information indicating the attitude of the working equipment 2 acquired from the sensor controller 26 of the excavator 1, that is, the inclination angles $\theta 1$, $\theta 2$, and $\theta 3$.

The storage unit 51M of the processing device 51 stores the data of the working equipment 2 (hereinafter appropriately referred to as working equipment data). The working equipment data includes a length L1 of the boom 6, a length L2 of the arm 7, and a length L3 of the bucket 8. As illustrated in FIG. 3, the length L1 of the boom 6 corresponds to the length from a boom pin 13 to an arm pin 14. The length L2 of the arm 7 corresponds to the length from the arm pin 14 to a bucket pin 15. The length L3 of the bucket 8 corresponds to the length from the bucket pin 15 to the cutting edge 8T of the bucket 8. The cutting edge 8T is the tip of the blade 8B illustrated in FIG. 1. The working equipment data includes information on the position up to the boom pin 13 with respect to the origin position PL of the vehicle body coordinate system. The processing device 51 can obtain a cutting edge position P4 with respect to the origin position PL by using the lengths L1, L2, and L3, the inclination angles θ1, θ2, and θ3 and the origin position PL. In the embodiment, the processing device 51 of the facility 50 has obtained the cutting edge position P4, but the sensor controller 26 of the excavator 1 may obtain the cutting edge position P4 and transmit the cutting edge position P4 to the processing device 51 of the facility 50. Since the cutting edge position P4 is the position of the cutting edge 8T of the bucket 8 which is a part of the working equipment 2, the cutting edge position P4 is the position of the working equipment 2. In the former case, the attitude detection device 32, the sensor controller 26, and the processing device 51 correspond to a position detection unit that detects the position of the working equipment 2. In the latter case, the attitude detection device 32 and the sensor controller 26 correspond to the position detection unit that detects the position of the working equipment 2.

The position detection unit is not limited to the attitude detection device 32, the sensor controller 26, and the processing device 51, or the attitude detection device 32 and the sensor controller 26 described above. For example, the position of the working equipment may be detected by a distance measuring device such as a stereo camera or a laser scanner. In this case, the distance measuring device corresponds to the position detection unit that detects the position of the working equipment.

<Example of Control Executed by Image Display System 100 and Remote Operation System 101>

Figure 6:
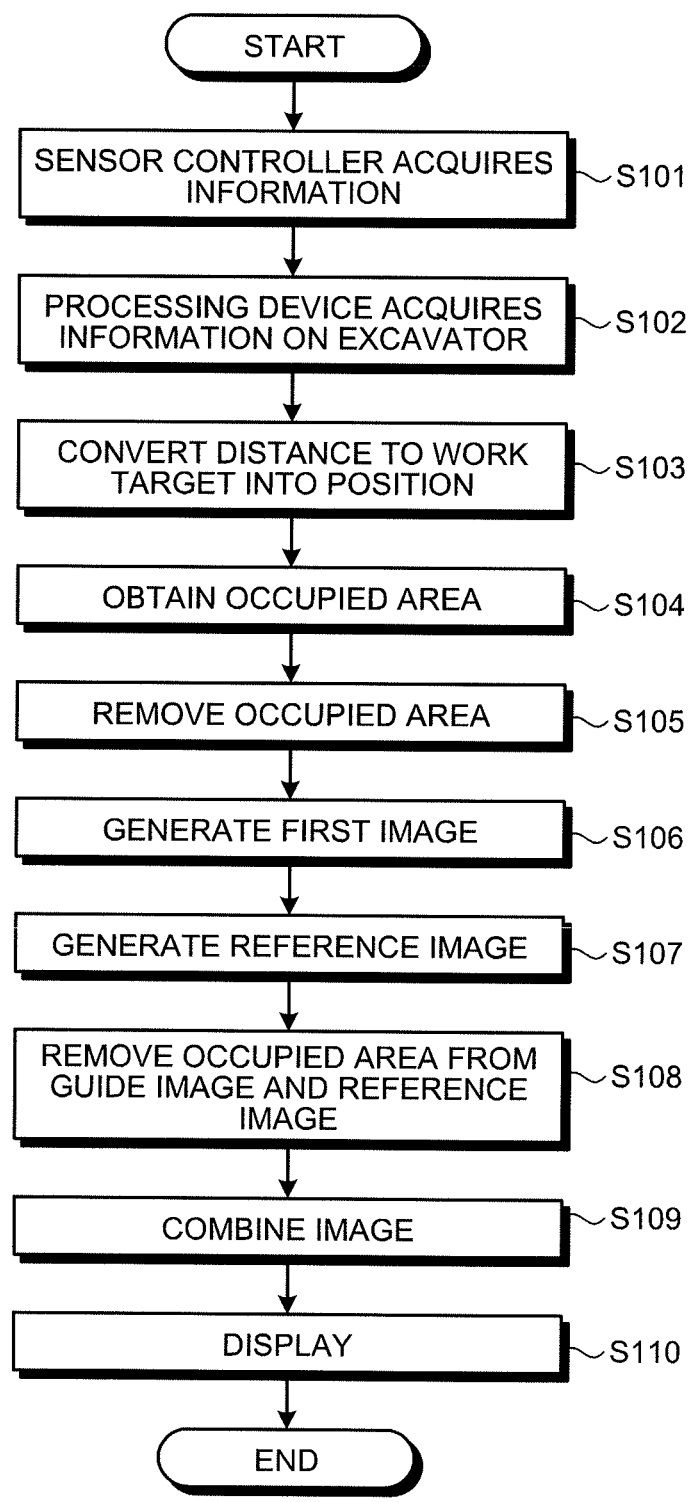
FIG. 6 is a flowchart of an example of control executed by the image display system and the remote operation system according to the embodiment.
Figure 7:
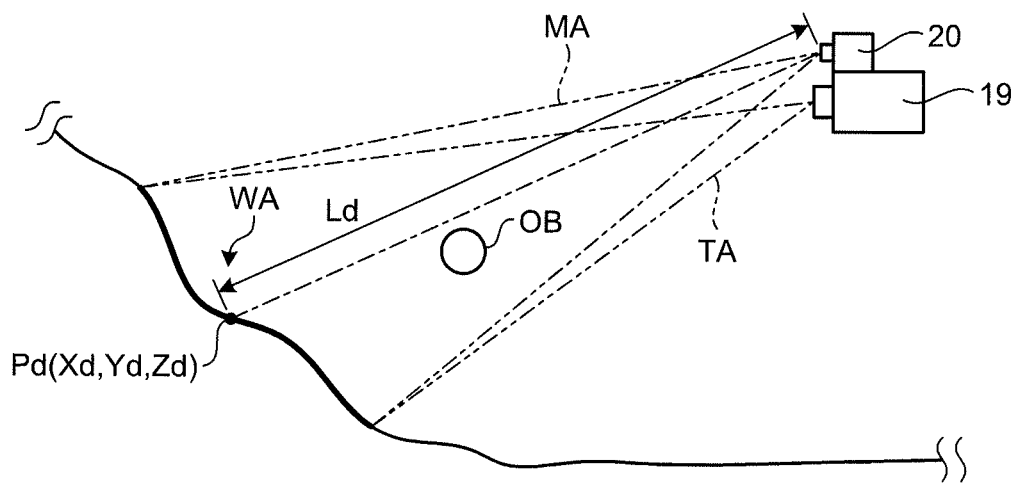
FIG. 7 is a diagram illustrating the imaging device, the distance detection device, and a work target.

FIG. 6 is a flowchart of an example of control executed by the image display system 100 and the remote operation system 101 according to the embodiment. FIG. 7 is a diagram illustrating the imaging device 19, the distance detection device 20, and the work target WA.

In step S101, the sensor controller 26 illustrated in FIG. 2 acquires information on the excavator 1. The information on the excavator 1 is information obtained from the imaging device 19, the distance detection device 20, the position computing device 23, the attitude detection device 32, and the IMU 33. As illustrated in FIG. 7, the imaging device 19 images the work target WA within an imaging range TA, and obtains an image of the work target WA. The distance detection device 20 detects a distance Ld from the distance detection device 20 to the work target WA and other objects existing in a detection range MA. The position computing device 23 obtains pieces of reference position information Pga1 and Pga2 corresponding to the positions P1 and P2 of the GNSS antennas 21 and 22 in the global coordinate system. The attitude detection device 32 detects the boom cylinder length, the arm cylinder length and the bucket cylinder length. The IMU 33 detects the attitude of the excavator 1, more specifically, the roll angle θ4, the pitch angle θ5, and the yaw angle of the upper turning body 3.

In step S102, the image display system 100 and the processing device 51 of the remote operation system 101 acquire the information on the excavator 1 from the sensor controller 26 of the excavator 1 via the communication device 25 of the excavator 1 and the communication device 54 connected to the processing device 51.

The information on the excavator 1 acquired from the sensor controller 26 by the processing device 51 includes an image of the work target WA imaged by the imaging device 19, information on a distance from the distance detection device 20 to the work target WA, the information being detected by the distance detection device 20, information on the attitude of the working equipment 2 of the excavator 1, the information being detected by the attitude detection device 32, reference position information Pga1, Pga2, and information on the attitude of the excavator 1.

The information on the distance from the distance detection device 20 to the work target WA includes: the distance Ld to the work target WA or an object OB existing in the detection range MA, and information on the orientation of the position Pd corresponding to the distance Ld. In the example illustrated in FIG. 7, the distance Ld is indicated as a distance to the work target WA. The information on the orientation of the position Pd is an orientation of the position Pd with reference to the distance detection device 20 and is an angle with respect to the respective axes Xd, Yd, and Zd of the coordinate system of the distance detection device 20. Information on the attitude of the working equipment 2 to be acquired by the processing device 51 is the inclination angles θ1, θ2, and θ3 of the working equipment 2 obtained by the sensor controller 26 using the boom cylinder length, the arm cylinder length, and the bucket cylinder length. The information on the attitude of the excavator 1 is the roll angle θ4, the pitch angle θ5 and the yaw angle of the excavator 1, more specifically, the upper turning body 3.

The processing device 51 obtains the cutting edge position P4 of the bucket 8 by using the inclination angles θ1, θ2, and θ3 of the working equipment 2 acquired from the sensor controller 26, the length L1 of the boom 6, the length L2 of the arm 7, and the length L3 of the bucket 8, the length L1, the length L2, and the length L3 being stored in the storage unit 51M. The cutting edge position P4 of the bucket 8 is a set of coordinates in the vehicle body coordinate system (Xm, Ym, Zm) of the excavator 1.

In step S103, the processing device 51 converts the distance Ld to the work target WA into position information using the information on the distance to the work target WA. The position information is coordinates of the position Pd in the coordinate system (Xd, Yd, Zd) of the distance detection device 20. In step S103, all distances Ld detected by the distance detection device 20 within the detection range MA are converted into position information. The processing device 51 converts the distance Ld into position information by using the distance Ld and the information on the orientation of the position Pd corresponding to the distance Ld. In step S103, the distance to the object OB existing in the detection range MA is also converted to position information, similarly to the distance Ld of the work target WA. By the processing in step S103, information on the position of the work target WA within the detection range MA is obtained. From the information on the position of the work target WA, information on the shape of the work target WA can be obtained.

The information on the position and shape of the work target WA is a set of coordinates of the position Pd in the coordinate system (Xd, Yd, Zd) of the distance detection device 20. After converting the information on the shape of the work target WA into the values of the imaging device coordinate system (Xc, Yc, Zc), the processing device 51 converts the converted values into the values of the vehicle body coordinate system (Xm, Ym, Zm). Next, in step S104, the processing device 51 obtains an occupied area SA.

Figure 8:
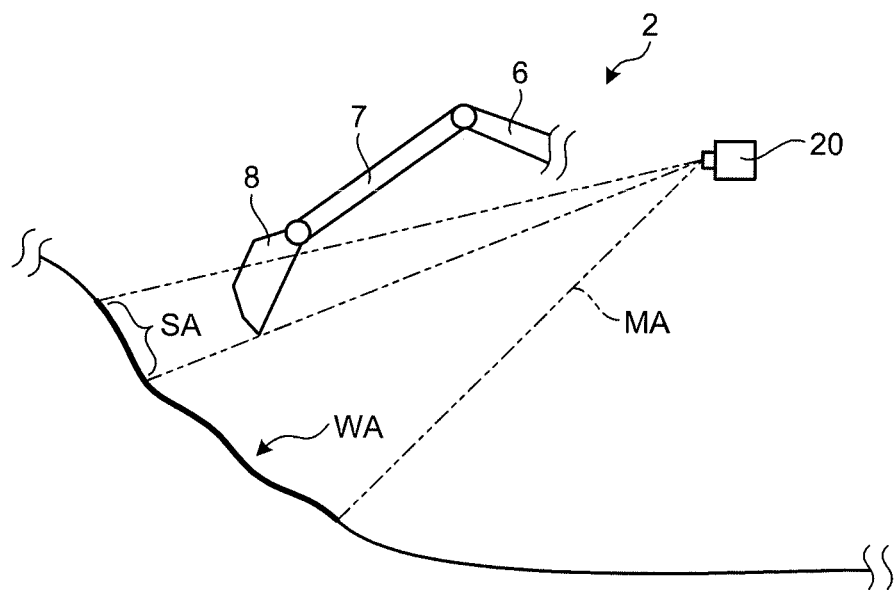
FIG. 8 is a view for explaining an occupied area.

FIG. 8 is a diagram for explaining the occupied area SA. The occupied area SA is an area occupied by the working equipment 2 within the information on the shape of the work target WA. In the example illustrated in FIG. 8, the bucket 8 of the working equipment 2 is within the detection range MA of the distance detection device 20 and between the distance detection device 20 and the work target WA. Therefore, the distance detection device 20 detects the distance to the bucket 8 instead of the distance to the work target WA in the portion of the occupied area SA. In step S105, the processing device 51 removes the portion of the occupied area SA from the information on the shape of the work target WA obtained in step S103.

In removing the portion of the occupied area SA, the processing device 51 stores information on at least one of the position and the attitude detected by the distance detection device 20 according to at least one of the position and attitude of the bucket 8, for example, in the storage unit 51M. Such information is included in the attitude of the working equipment 2 of the excavator 1 in the present embodiment. The attitude of the working equipment 2 can be obtained by using the inclination angles θ1, θ2, and θ3 of the working equipment 2, the length L1 of the boom 6, the length L2 of the arm 7 and the length L3 of the bucket 8, and using the attitude of the excavator 1 as required. Then, the processing device 51 compares the information detected by the distance detection device 20 with the information stored in the storage unit 51M, and if the above two pieces of information are matched, it is possible that the bucket 8 is detected. Since the portion matched by both pieces of information corresponds to the occupied area SA, the processing device 51 removes the portion of the occupied area SA from the information on the shape of the work target WA.

By the processing of removing the occupied area SA using the attitude of the working equipment 2, since the processing device 51 does not use the information on the bucket 8 of the occupied area SA when generating the reference image 65 which is the index representing the position of the work target WA illustrated in FIG. 1, the processing device 51 can correctly generate the reference image 65.

The processing of removing the portion of the occupied area SA using the attitude of the working equipment 2 may be performed by the following method. Information on at least one of the position and attitude of the bucket 8 in the vehicle body coordinate system included in the attitude of the working equipment 2 is obtained from the inclination angles θ1, θ2, and θ3 of the working equipment 2, the length L1 of the boom 6, the length L2 of the arm 7, and the length L3 of the bucket 8. In step S103, information on the shape of the work target WA in the vehicle body coordinate system is obtained. In step S105, the processing device 51 removes from the shape of the work target WA, an area obtained by projecting the position of the bucket 8 on the information on the shape of the work target WA, as the occupied area SA.

Figure 9:
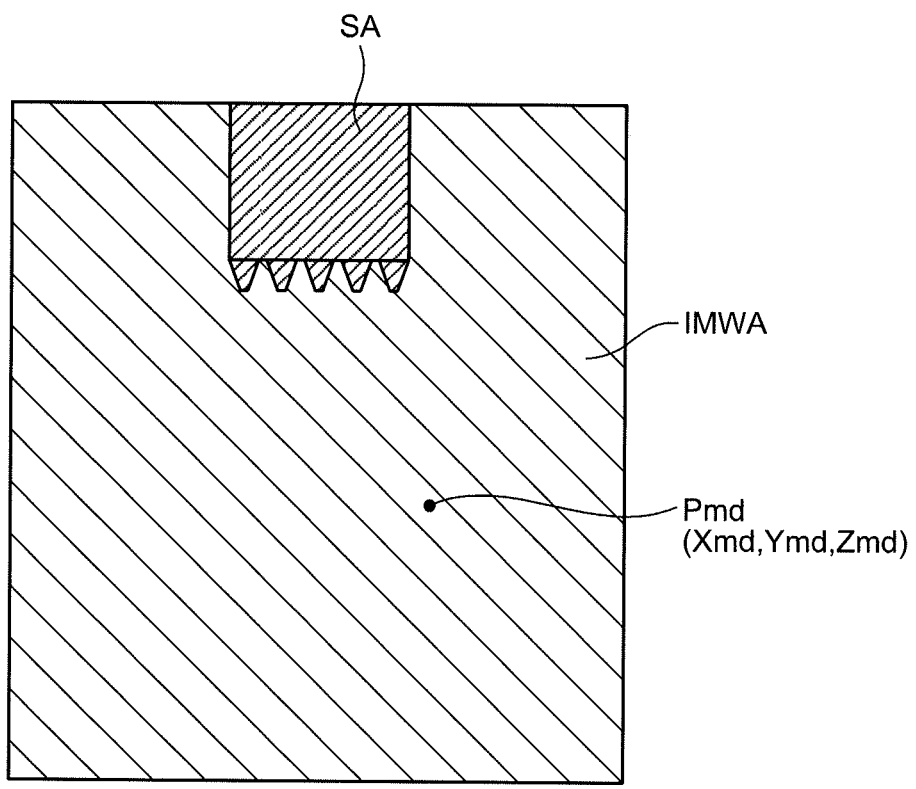
FIG. 9 is a view illustrating information on a shape of a work target from which the occupied area has been removed.

FIG. 9 is a view illustrating information on a shape of the work target WA from which the occupied area has been removed. Information IMWA on the shape of the work target WA is a set of coordinates Pmd (Xmd, Ymd, Zmd) in the vehicle body coordinate system (Xm, Ym, Zm). In the occupied area SA, no information on the coordinates exists in the processing of step S105. Next, in step S106, the processing device 51 generates a first image. The first image is an image including a portion corresponding to the bucket 8 or a portion corresponding to a part of the bucket 8 on the work target WA and extending along a direction in which the upper turning body 3 of the excavator 1 rotates.

<First Image>

Figure 10:
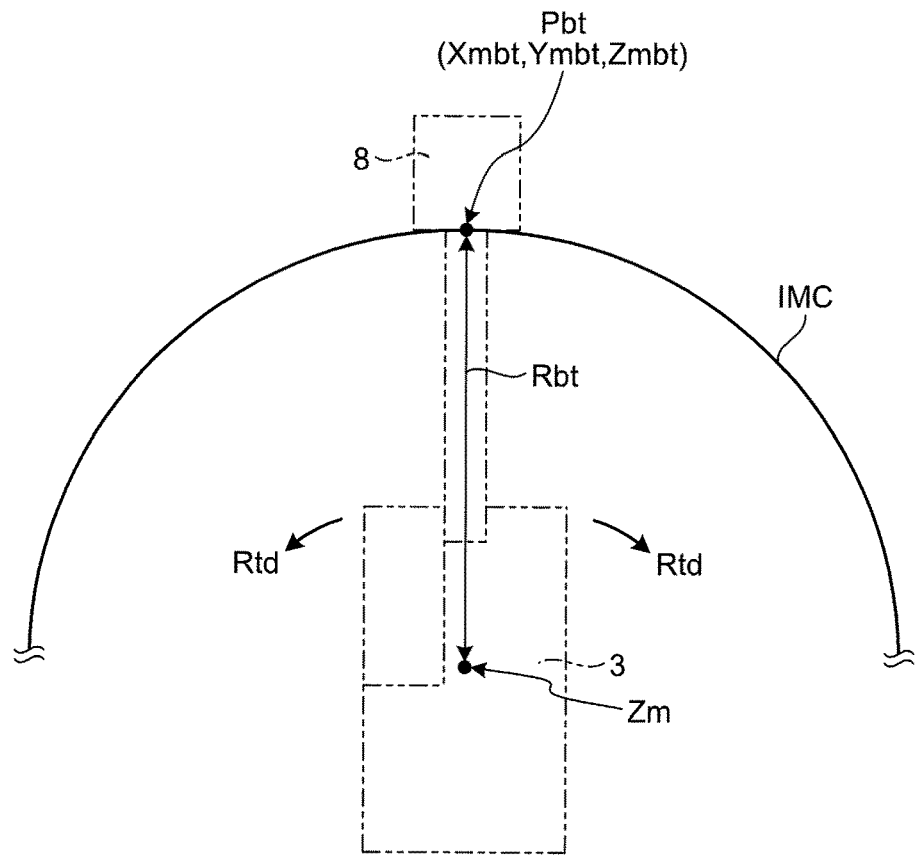
FIG. 10 is a view illustrating an example of a first image.
Figure 11:
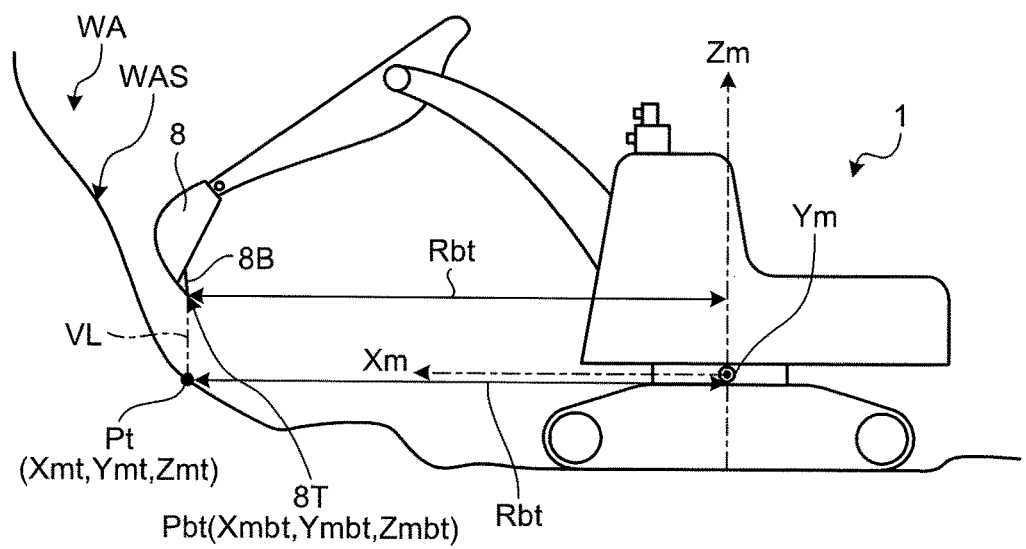
FIG. 11 is a view for explaining processing in which a processing device generates the first image.
Figure 12:
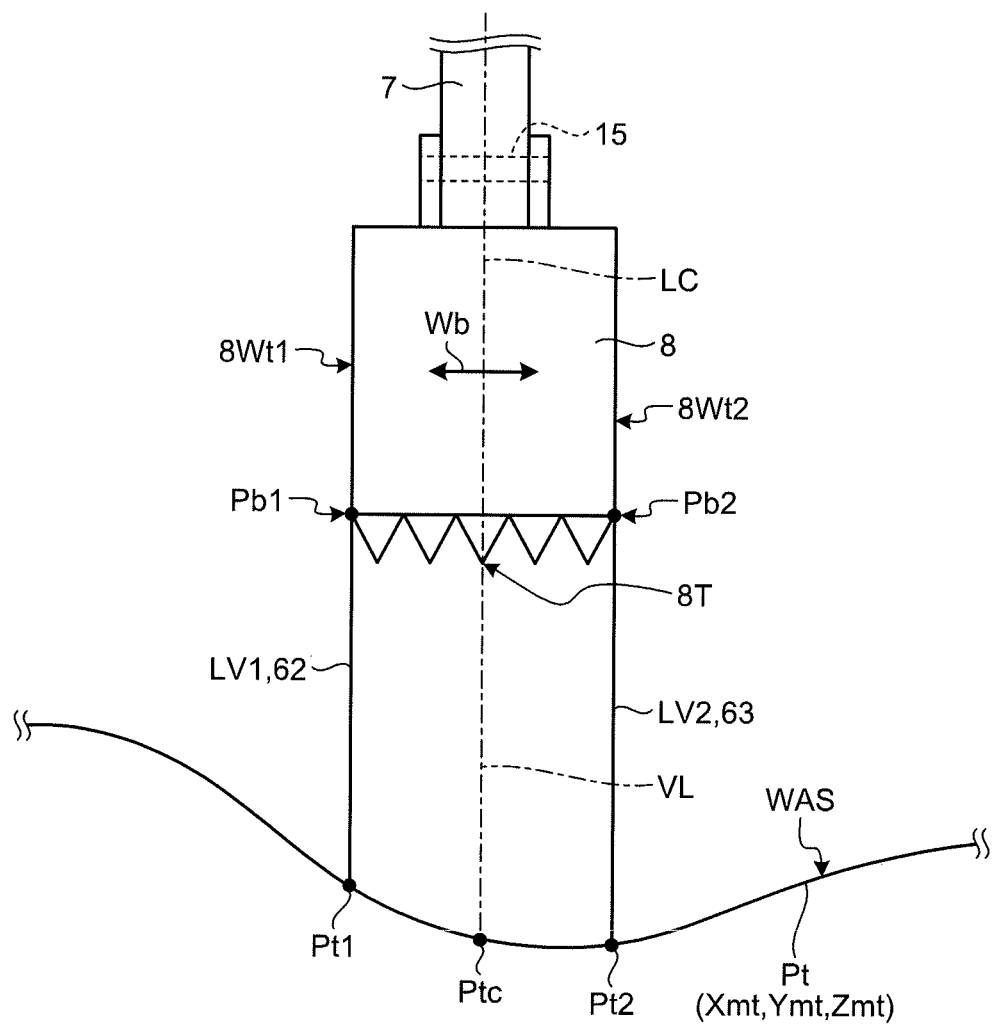
FIG. 12 is a view for explaining processing in which the processing device generates the first image.

FIG. 10 is a view illustrating an example of a first image IMC. FIGS. 11 and 12 are views for explaining processing in which the processing device 51 generates the first image IMC. In the embodiment, the first image IMC illustrated in FIG. 10 indicates the position of the cutting edge 8T of the bucket 8 on the work target WA, and indicates the position of the cutting edge 8T on the surface of the work target WA when the upper turning body 3 turns while the working equipment 2 maintains the current attitude. Next, processing in which the processing device 51 generates the first image IMC will be described.

As illustrated in FIG. 10 and FIG. 12, the first image IMC is an image of a circular arc whose radius is a distance Rbt between the Zm axis and the bucket 8 and whose center is the position corresponding to the Zm axis, as seen from the Zm axis of the vehicle body coordinate system which is a turning center axis of the upper turning body 3. In the embodiment, the position of the bucket 8 used for obtaining the distance Rbt is the position of the cutting edge 8T of the bucket 8 existing in the center of the bucket 8 in a width direction Wb, as illustrated in FIG. 12. The position of the bucket 8 used for determining the distance Rbt is not limited to the cutting edge 8T at the center of the bucket 8 in the width direction Wb. The distance Rbt is the distance between the Zm axis of the vehicle body coordinate system along the direction parallel to the Xm-Ym plane of the vehicle body coordinate system and a position Pbt (Xmbt, Ymbt, Zmbt) of the cutting edge 8T at the center in the width direction Wb of the bucket 8. The position Pbt (Xmbt, Ymbt, Zmbt) is a position in the vehicle body coordinate system.

A line LC in FIG. 12 indicates the center in the width direction Wb of the bucket 8. The width direction Wb of the bucket 8 is a direction parallel to the extending direction of the bucket pin 15 connecting the bucket 8 and the arm 7 and is a direction parallel to the Ym axis of the vehicle body coordinate system. The distance Rbt is a distance between the Zm axis and the cutting edge 8T of the bucket 8 along the direction parallel to the Xm axis in the vehicle body coordinate system.

The position indicated by the first image IMC is the position of a surface WAS of the work target WA. The processing device 51 obtains a position Pt (Xmt, Ymt, Zmt) of a portion (hereinafter appropriately referred to as an intersecting portion) where a circular arc whose radius is the distance Rbt with the Zm axis as the center of the vehicle body coordinate system is projected on the surface WAS of the work target WA in the direction parallel to the Zm axis of the vehicle body coordinate system. An image of the intersecting portion becomes the first image IMC.

The position Pt (Xmt, Ymt, Zmt) of the intersecting portion is, for example, the position of the portion where a curved surface having the radius of the distance Rbt around the Zm axis of the vehicle body coordinate system intersects with the surface WAS of the work target WA. A portion where the straight line VL passing through the cutting edge 8T of the bucket 8 existing in the center in the width direction Wb of the bucket 8 and extending in a direction parallel to the Zm axis of the vehicle body coordinate system intersects with the surface WAS of the work target WA is a position of a part of the intersecting portion. The processing device 51 generates the first image IMC using the information on the position Pt (Xmt, Ymt, Zmt) of the intersecting portion. The first image IMC corresponds to the information on the position Pt (Xmt, Ymt, Zmt) of the intersecting portion.

A first position Ptc in a position Pt (Xmt, Ymt, Zmt) of the intersecting portion corresponds to the position of the bucket 8 on the surface WAS of the work target WA facing the bucket 8, and in the embodiment, the first position Ptc corresponds to the position of the cutting edge 8T of the bucket 8 existing in the center of the bucket 8 in the width direction Wb. The first position Ptc is not limited to the position of the cutting edge 8T at the center in the width direction Wb, and may be, for example, a position at one end in the width direction Wb.

The position of the portion extending from the first position Ptc along the turning direction Rtd of the upper turning body 3 is a position of a portion extending along the turning direction Rtd from the first position Ptc, among the position Pt (Xmt, Ymt, Zmt) of the intersecting portion. The first image IMC corresponds to information on the first position Ptc and information on a position of a portion extending along the turning direction Rtd from the first position Ptc. That is, the first image IMC is generated based on the information on the first position Ptc and the information on the position of the portion extending along the turning direction Rtd from the first position Ptc.

In the embodiment, the processing device 51 also causes the display device 52 illustrated in FIG. 1 to display a first straight line image 62 which is an image of a straight line LV1 and a second straight line image 63 which is an image of a straight line LV2. The straight line LV1 is a straight line extended to the surface WAS of the work target WA along a direction parallel to the Zm axis of the vehicle body coordinate system from a position Pb1 outside the blade 8B on one end 8Wt1 side in the width direction Wb of the bucket 8. The straight line LV2 is a straight line extended to the surface WAS of the work target WA along a direction parallel to the Zm axis of the vehicle body coordinate system from a position Pb2 outside the blade 8B on the other end 8Wt2 side in the width direction Wb of the bucket 8. A position of a portion where the straight line LV1 intersects with the surface WAS of the work target WA is defined as Pt1, and a position of a portion where the straight line LV2 intersects with the surface WAS of the work target WA is defined as Pt2. Since the position of each part of the bucket 8 in the vehicle body coordinate system and the position of the surface WAS of the work target WA in the vehicle body coordinate system are known, the processing device 51 can determine the positions Pb1, Pb2, Pt1, and Pt2 from these positions. If the positions Pb1, Pb2, Pt1, and Pt2 are obtained, the straight line LV1 and the straight line LV2 can also be obtained; therefore, the processing device 51 can generate the first straight line image 62 and the second straight line image 63.

When the first image IMC, the first straight line image 62, and the second straight line image 63 are obtained, the processing device 51 converts the first image IMC, the first straight line image 62, and the second straight line image 63 into an image of the viewpoint of the imaging device 19. The image of the viewpoint of the imaging device 19 is an image based on the imaging device 19. Next, processing for converting the first image IMC, the first straight line image 62, and the second straight line image 63 into the image of the viewpoint of the imaging device 19 will be described.

Figure 13:
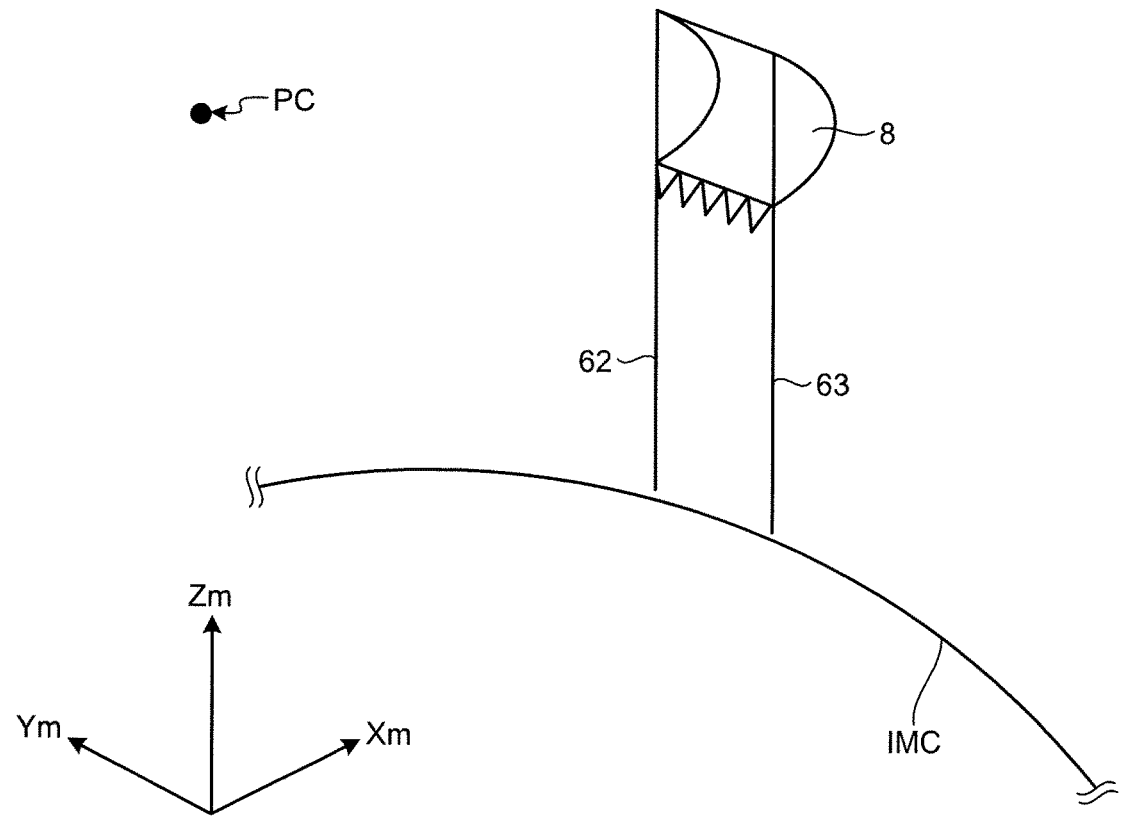
FIG. 13 is a view illustrating a positional relationship between the origin of the imaging device, and the first image, a first straight line image, and a second straight line image.

FIG. 13 is a view illustrating a positional relationship between the origin PC of the imaging device 19, and the first image IMC, the first straight line image 62, and the second straight line image 63. The image at the viewpoint of the imaging device 19 is an image when seeing the first image IMC, the first straight line image 62, and the second straight line image 63 from the origin PC of the imaging device 19 in the vehicle body coordinate system (Xm, Ym, Zm).

The first image IMC, the first straight line image 62, and the second straight line image 63 are images in a three-dimensional space, but the image of the viewpoint of the imaging device 19 is a two-dimensional image. Therefore, the processing device 51 performs perspective projection conversion of projecting three-dimensional space, that is, the first image IMC defined in the vehicle body coordinate system (Xm, Ym, Zm), the first straight line image 62, and the second straight line image 63 on the two-dimensional plane. The first image IMC, the first straight line image 62, and the second straight line image 63 converted into the image of the viewpoint of the imaging device 19 are an image 60 for indicating the position of the bucket 8 on the work target WA illustrated in FIG. 1. Hereinafter, the image 60 is referred to as a guide image 60 as appropriate.

Figure 14:
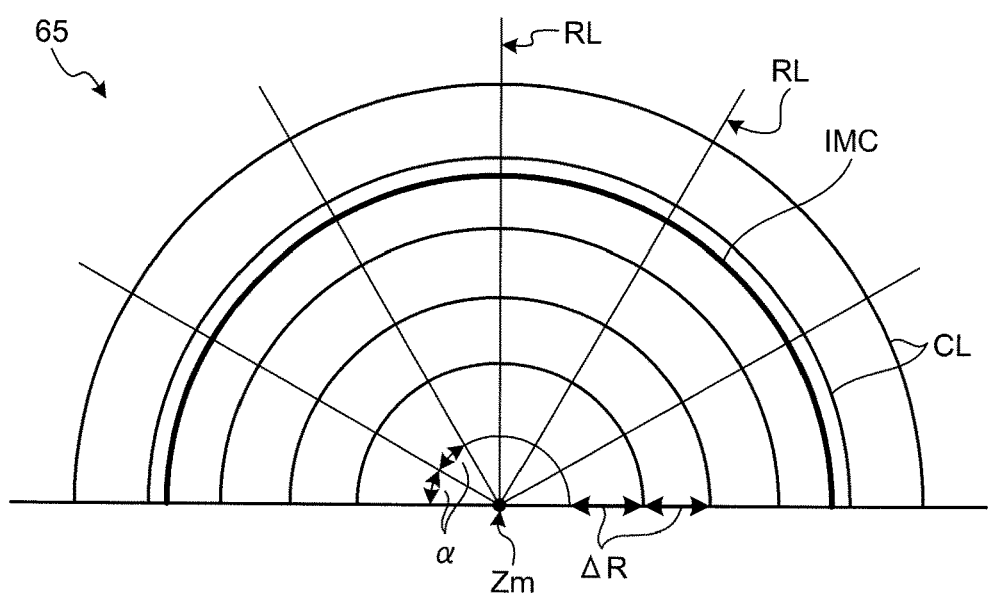
FIG. 14 is a view illustrating a reference image and the first image illustrated in FIG. 1.

FIG. 14 is a view illustrating the reference image 65 and the first image IMC illustrated in FIG. 1. When the guide image 60 is generated, the processing proceeds to step S107, and the processing device 51 generates the reference image 65. The reference image 65 is a line image along the surface WAS of the work target WA. The processing device 51 generates the reference image 65 by using the information on the position of the work target WA, specifically the information on the position on the surface WAS of the work target WA.

The reference image 65 includes a plurality of first line images RL radially extending from a position corresponding to the Zm axis which is the turning center axis of the upper turning body 3, and a plurality of second line images CL extending along the turning direction Rtd of the upper turning body 3 around the Zm axis. In the embodiment, the plurality of first line images RL are line images extending radially from the Zm axis, and arranged in a circumferential direction of a circle centered on the Zm axis, as seen from the Zm axis direction of the vehicle body coordinate system (Xm, Ym, Zm). The plurality of second line images CL are images of an arc or a circle extending along the circumferential direction of the circle centered on the Zm axis and are arranged along the radial direction of the circle centered on the Zm axis, as seen from the Zm axis direction of the vehicle body coordinate system (Xm, Ym, Zm).

Since the first line image RL and the second line image CL are defined by the vehicle body coordinate system (Xm, Ym, Zm), the first line image RL and the second line image CL contain three-dimensional information. In the embodiment, the plurality of first line images RL are arranged at equal intervals for each angle α along the circumferential direction of the circle centered on the Zm axis. The plurality of second line images CL are arranged at equal intervals every distance ΔR along the radial direction of the circle centered on the Zm axis.

After generating the first line image RL and the second line image CL, the processing device 51 converts the first line image RL and the second line image CL into the image of the viewpoint of the imaging device 19, and generates the reference image 65. By converting the first line image RL and the second line image CL into the image of the viewpoint of the imaging device 19, the display device 52 can display the reference image 65 while deforming the reference image 65 according to the shape of the work target WA.

Next, in step S108, the processing device 51 removes the aforementioned occupied area SA from the generated guide image 60 and the reference image 65. Since the guide image 60 and the reference image 65 are generated from the information on the shape of the work target WA, removing the occupied area SA from the guide image 60 and the reference image 65 means removing the occupied area SA from the information on the shape of the work target WA. The processing device 51 may generate the guide image 60 and the reference image 65 by using information on the shape of the work target WA from which the occupied area SA has been removed.

In step S108, the processing device 51 converts the occupied area SA into the image of the viewpoint of the imaging device 19, and removes the converted image from the guide image 60 and the reference image 65. The processing device 51 may remove the occupied area SA before being converted into the image of the viewpoint of the imaging device 19 from the first image IMC, the first straight line image 62 and the second straight line image 63 before being converted into the image of the viewpoint of the imaging device 19, and the first line image RL and the second line image CL before being converted into the image of the viewpoint of the imaging device 19.

Figure 15:
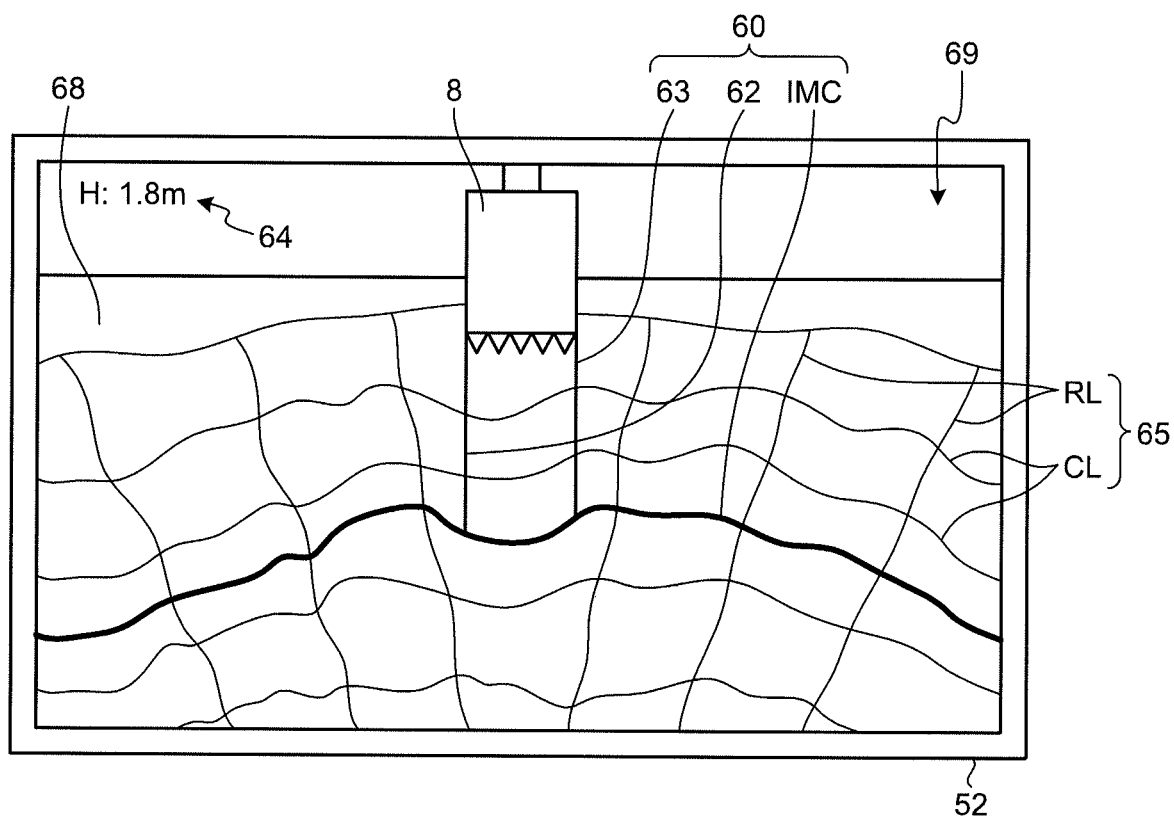
FIG. 15 is a view illustrating a working image.

FIG. 15 is a view illustrating the working image 69. In step S109, the processing device 51 combines the guide image 60 from which the occupied area SA has been removed, the reference image 65, and the second image 68 of the work target WA imaged by the imaging device 19, and generates the working image 69. In step S110, the processing device 51 causes the display device 52 to display the generated working image 69. The working image 69 is an image obtained by combining the image 68 of the work target WA, the reference image 65, and the guide image 60.

Since the reference image 65 is a plurality of line images extending to the surface WAS of the work target WA along the circumferential direction and the radial direction of a circle centered on the turning center axis of the upper turning body 3, an operator of the excavator 1 can grasp the position of the work target WA by referring to the reference image 65. For example, an operator can grasp the depth, that is, the position in the front-rear direction of the upper turning body 3 of the excavator 1 by the second line image CL, and can grasp the position of the upper turning body 3 in the turning direction Rtd from the first line image RL.

Since the distance Rbt varies according to the distance between the bucket 8 and the Zm axis, the first image IMC also moves away from the excavator 1 or approaches the excavator 1 according to the distance between the bucket 8 and the Zm axis. Since the first image IMC moves according to the current position of the bucket 8, an operator can grasp the position of the work target WA and the bucket 8 by operating the working equipment 2 while referring to the first image IMC. As a result, a decrease in work efficiency is suppressed. In addition, a decrease in accuracy of work is suppressed.

When the upper turning body 3 turns while the working equipment 2 is in the current attitude, an operator can easily grasp whether the position of the excavation target is on the side farther than the bucket 8 or on the side closer to the bucket 8 by referring to the first image IMC and the second line image CL. As a result, a decrease in work efficiency is suppressed. In addition, a decrease in accuracy of work is suppressed.

The first straight line image 62 and the second straight line image 63 indicate the position of the cutting edge 8T of the bucket 8 on the surface WAS of the work target WA. That is, the portion sandwiched between the first straight line image 62 and the second straight line image 63 on the surface WAS of the work target WA becomes the position of the cutting edge 8T of the bucket 8. Therefore, an operator can more easily grasp the positional relationship between the bucket 8 and the work target WA from the first straight line image 62 and the second straight line image 63. As a result, a decrease in work efficiency is suppressed. In addition, a decrease in accuracy of work is suppressed.

Since the reference image 65 and the first image IMC are displayed along the work target WA, for example, the shape of a target terrain worked by the excavator 1, the relative positional relationship between the reference image 65 and the first image IMC can be easily grasped on the terrain surface two-dimensionally displayed on the display device 52. Furthermore, since the first line image RL and the second line image CL constituting the reference image 65 are arranged at equal intervals in the vehicle body coordinate system, an operator is easy to grasp the sense of distance on a topography surface, and can easily grasp a perspective feeling.

In the embodiment, the working image 69 may include information 64 indicating a distance between the cutting edge 8T of the bucket 8 and the work target WA. The information 64 has an advantage that an operator can grasp an actual distance between the cutting edge 8T of the bucket 8 and the work target WA. The distance between the cutting edge 8T of the bucket 8 and the work target WA can be a distance from the cutting edge 8T at the center in the width direction Wb of the bucket 8 to the surface WAS of the work target WA.

The information 64 may be spatial position information relating to the working tool or work target WA. The spatial position information includes information such as, instead of or in addition to the distance between the cutting edge 8T of the bucket 8 and the work target WA, information on the attitude such as the angle of the bucket 8, information indicating a relative distance between the bucket 8 and the work target WA, information indicating the relationship between, for example, the orientation of the cutting edge 8T of the bucket 8 and the orientation of the surface of the work target WA, information indicating the position of the bucket 8 in coordinates, information indicating the orientation of the surface of the work target WA, and information indicating the distance in the Xm direction in the vehicle body coordinate system from the imaging device 19 to the cutting edge 8T of the bucket 8.

That is, the processing device 51 obtains at least one of the position of the bucket 8 that is a working tool, the attitude of the bucket 8, the position of the work target WA, the relative attitude of the work target WA, the relative distance between the bucket 8 and the work target WA, and the relative attitude between the bucket 8 and the work target WA, and causes the display device 52 to display the obtained one.

<Reference Image According to Modification>

Figure 16:
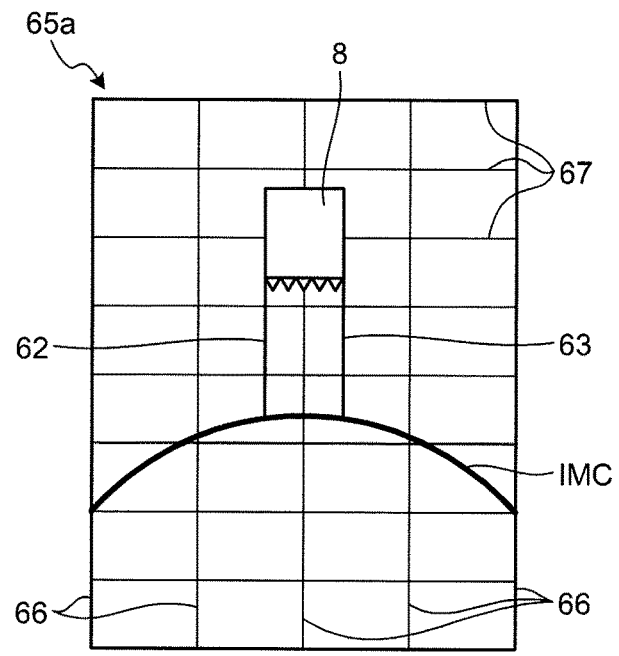
FIG. 16 is a view illustrating a reference image according to a modification.

FIG. 16 is a view illustrating a reference image 65a according to a modification. The reference image 65a is an image of a lattice formed by the plurality of first linear images 66 and the plurality of second linear images 67 orthogonal to the plurality of first linear images 66, as seen from the direction of the Zm axis in the vehicle body coordinate system (Xm, Ym, Zm), unlike the reference image 65 in which the vehicle body coordinate system is a polar coordinate system. The plurality of first linear images 66 are parallel to the Xm axis of the vehicle body coordinate system and the plurality of second linear images 67 are parallel to the Ym axis of the vehicle body coordinate system. Intervals at which the plurality of first linear images 66 are arranged are equal to each other. Also, the intervals at which the plurality of second linear images 67 are arranged are equal to each other. Each of the intervals in which the plurality of first linear images 66 are arranged is equal to each of the intervals in which the plurality of second linear images 67 are arranged.

The processing device 51 combines the guide image 60 from which the occupied area SA has been removed, the reference image 65a, and the second image 68 of the work target WA imaged by the imaging device 19, and generates the working image 69. The processing device 51 causes the display device 52 to display such a grid image together with the guide image 60. Accordingly, an operator can also easily grasp the positional relationship between the position of the bucket 8 and the work target WA at the time of turning and excavation.

<Third Image>

Figure 17:
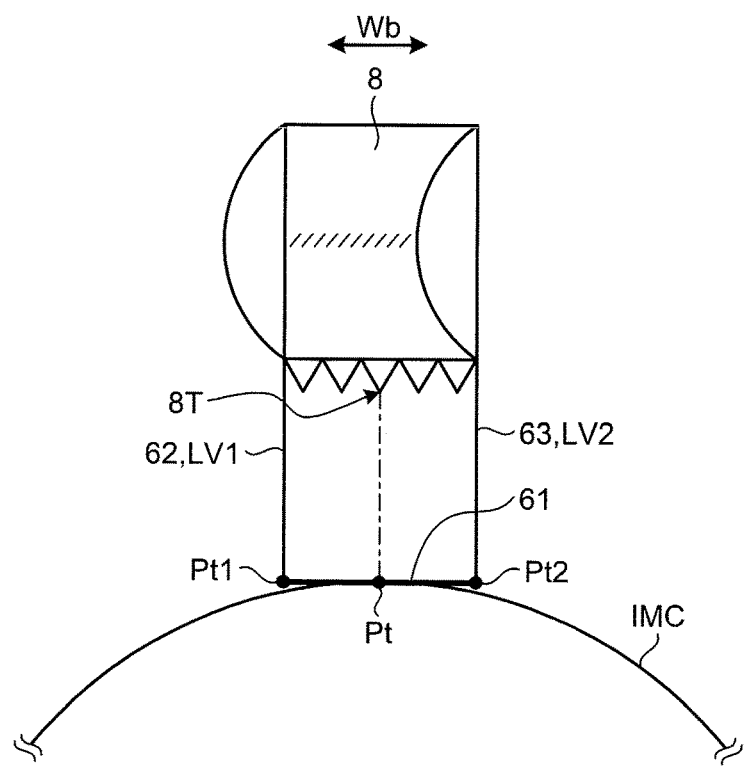
FIG. 17 is a view illustrating an example of the first image and a third image.

FIG. 17 is a view illustrating an example of the first image IMC and a third image 61. The third image 61 is a line image connecting a position Pt1 and a position Pt2 and along the surface WAS of the work target WA. The position Pt1 is a position of a portion where the straight line LV1 corresponding to the first straight line image 62 intersects with the surface WAS of the work target WA. The position Pt2 is a position of a portion where the straight line LV2 corresponding to the second straight line image 63 intersects with the surface WAS of the work target WA. The processing device 51 sets, as the third image 61, the set of the position of the surface WAS when the straight line connecting the first position Pt1 and the second position Pt2 is projected onto the surface WAS of the work target WA. The position Pt at which the straight line that is parallel to the Zm axis of the vehicle body coordinate system and extends from the cutting edge 8T at the center position in the width direction Wb of the bucket 8 intersects with the surface WAS of the work target WA is a part of the third image 61. The position Pt is also a part of the first image IMC.

The processing device 51 may cause the display device 52 to display the third image 61 in addition to the first image IMC. The third image 61 enables an operator to grasp the current position of the bucket 8 on the surface WAS of the work target WA. As a result, an operator can easily and reliably grasp the positional relationship between the bucket 8 and a work position. When the processing device 51 displays the first image IMC and the third image 61 on the display device 52, the display form of the first image IMC and the display form of the third image 61 may be different from each other. A step of making the display forms different from each other includes, for example, a step of making the color of the first image IMC different from the color of the third image 61, a step of making the thickness of the line of the first image IMC different from the thickness of the line of the third image 61, a step of making the line type of the first image IMC different from the line type of the third image 61, and a step of combining two or more of the above steps. By making the display form of the first image IMC and the display form of the third image 61 different from each other, an operator can easily distinguish the third image 61 from the first image IMC.

<Control System of Excavator 1 According to Modification>

Figure 18:
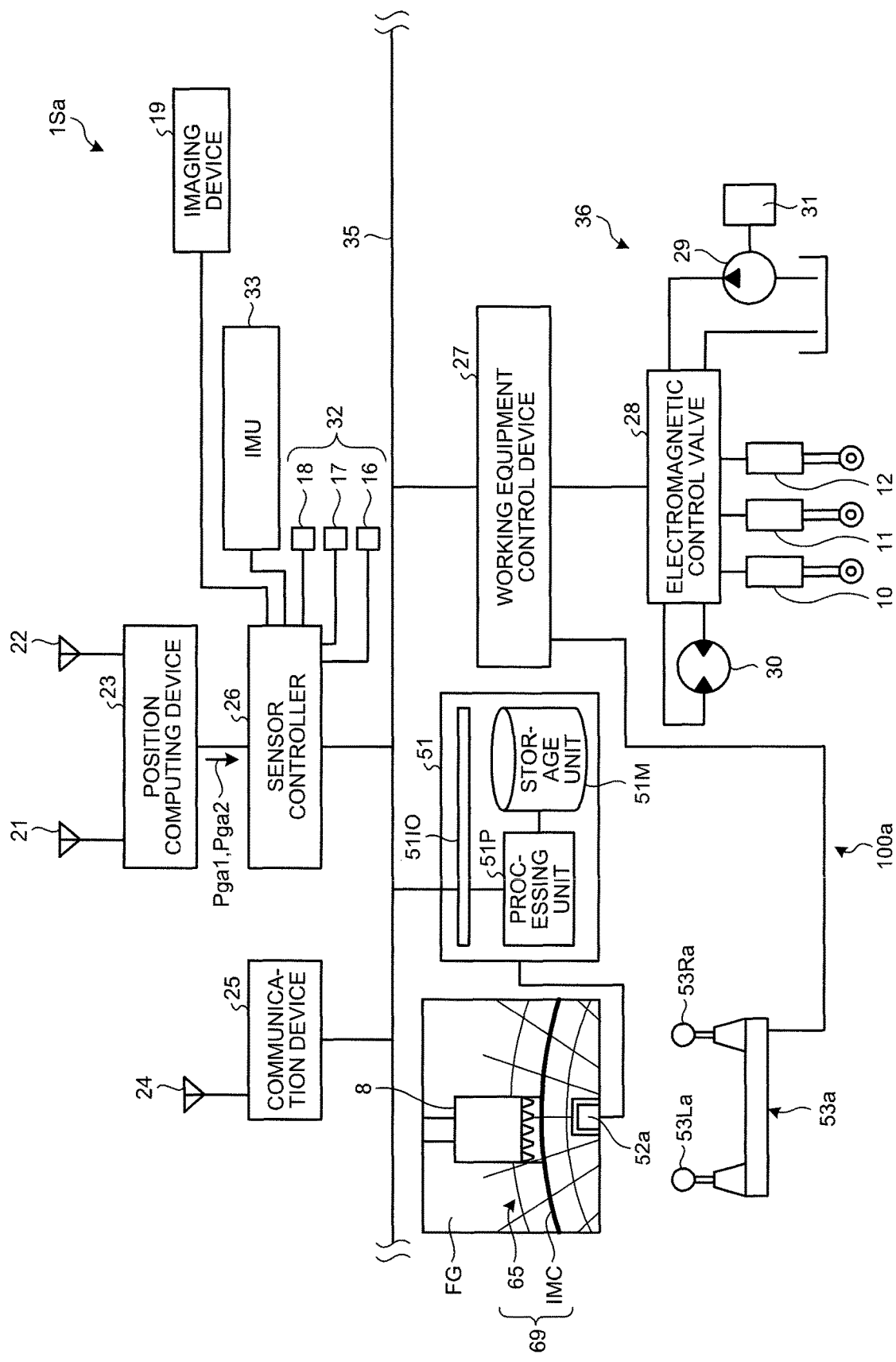
FIG. 18 is a diagram illustrating the control system of the excavator according to the modification.

FIG. 18 is a diagram illustrating a control system 1Sa of the excavator 1 according to the modification. The above-described image display system 100 and the remote operation system 101 remotely operate the excavator 1 using the operation device 53 of the facility 50 illustrated in FIG. 1. In the modification, a display device 52a is provided in the cab 4 illustrated in FIG. 1. In the modification, the working image 69 is displayed on the display device 52a in order to assist the work of an operator on the excavator 1.

In the control system 1Sa, the processing device 51 is connected to the signal line 35 of the above-described control system 1S. In the control system 1Sa, the operation device 53a is connected to the signal line 35 of the control system 1S via a working equipment control device 17. The display device 52a is connected to the processing device 51. The processing device 51 included in the control system 1Sa has the same function as the processing device 51 provided in the facility 50 illustrated in FIG. 1 in the image display system 100 and the remote operation system 101 described above. The processing device 51 and the display device 52a constitute an image display system 100a according to the modification.

In the modification, the processing device 51 may obtain the cutting edge position P4 using the detection values of a position detection device 32 and the sensor controller 26, and the sensor controller 26 may obtain the cutting edge position P4 using the detection value of the position detection device 32. In the former case, the position detection device 32, the sensor controller 26, and the processing device 51 correspond to the position detection unit that detects the position of the working tool. In the latter case, the position detection device 32 and the sensor controller 26 correspond to the position detection unit that detects the position of the working tool. The position detection unit may be the aforementioned distance measuring device such as a stereo camera or a laser scanner.

The display device 52a of the control system 1Sa is a head-up display which projects an image onto a front window FG of a driver's seat. The display device 52a may be a head mounted display. The display device 52a displays the working image 69 at a position matching the bucket 8 seen through the front window FG. In this case, since the work target WA and the bucket 8 are seen through the front window FG, the working image 69 displayed by the display device 52a only needs to include at least the first image IMC. That is, when the display device 52a is a head-up display or a head mounted display, the processing device 51 causes the display device 52a to display the first image IMC. In the modification, in addition to the first image IMC, the reference image 65 is also displayed on the display device 52a.

The display device 52a is not limited to a head-up display, and may be a normal display. When the display device 52a is a normal display, the processing device 51 causes the display device 52a to display the working image 69 in which at least the first image IMC and the second image 68 imaged by the imaging device 19 are combined.

The operation device 53a is a device for operating the excavator 1 and includes a left operation lever 53La and a right operation lever 53Ra. The operation device 53a may be a pilot hydraulic system or an electric system.

In the excavator 1 having the control system 1Sa, when the image display system 100a sees the work target WA from a predetermined position, for example, a position corresponding to the viewpoint of an operator seated in a driver's seat, the working image 69 including at least the first image IMC is displayed on the front window FG. With such processing, the operator can easily and reliably grasp the positional relationship between the bucket 8 and the work position by the first image IMC displayed on the front window FG. As a result, the image display system 100a can suppress a decrease in work efficiency and work accuracy. As the bucket 8 moves away from the vehicle body 1B of the excavator 1, the operator hardly grasps a perspective feeling; therefore, in such a case, the image display system 100a can suppress a decrease in work efficiency and work accuracy.

In addition, even an inexperienced operator can easily grasp the perspective feeling of the bucket 8 by using the excavator 1 having the image display system 100a. As a result, a decrease in work efficiency is suppressed. In addition, a decrease in accuracy of work is suppressed. Furthermore, even in a situation where it is difficult for an operator to visually observe the actual work target WA, like the night work, since the operator can work while viewing the working image 69 displayed on the display device 52a, so that a decrease in work efficiency and work accuracy is suppressed.

The image display systems 100 and 100a and the remote operation system 101 display the guide image 60 and the reference image 65 or 65a generated at the viewpoint of the imaging device 19 on the display device 52 while superposing the guide image 60 and the reference image 65 or 65a on the image 68 of the actual work target WA imaged by the imaging device 19. By such processing, the image display systems 100 and 100a and the remote operation system 101 can make it easier for an operator who remotely operates the excavator 1 using the image of the work target WA displayed on the display device 52, to grasp the positional relationship between the position of the bucket 8 and the work target WA. As a result, a decrease in work efficiency is suppressed. In addition, a decrease in accuracy of work is suppressed.

Since the first image IMC included in the guide image 60 extends along the turning direction Rtd of the upper turning body 3, an operator can easily grasp the relative positional relationship between the bucket 8 and a work spot in the work target WA when the upper turning body 3 turns, by referring to the guide image 60. As a result, the image display systems 100 and 100a and the remote operation system 101 can suppress a decrease in work efficiency in the work machine having the turning body, and can suppress a decrease in work accuracy.

Even an inexperienced operator can easily grasp the positional relationship between the position of the bucket 8 and a work spot in the work target WA by using the image display systems 100 and 100a and the remote operation system 101. As a result, a decrease in work efficiency and work accuracy is suppressed. In addition, by superimposing and displaying the guide image 60, the reference image 65 or 65a, and the image 68 of the actual work target WA on the display device 52, the image display systems 100 and 100a and the remote operation system 101 can suppress a decrease in work efficiency by using a single screen that the operator watches while working.

In the reference image 65 or 65a, the intervals between adjacent first line images RL are equal to each other and the intervals between adjacent second line images CL are equal to each other. Therefore, by superimposing and displaying the reference image 65 or 65a and the image 68 of the actual work target WA imaged by the imaging device 19, it becomes easier to grasp the work spot in the work target WA. In addition, by superimposing the first image IMC of the guide image 60 on the reference image 65, an operator can easily grasp the distance which the bucket 8 has moved, so that a decrease in work efficiency is suppressed.

In the guide image 60 and the reference image 65 or 65a, the occupied area SA that is the area of the working equipment 2 is removed; therefore, the guide image 60 and the reference image 65 or 65a can avoid the distortion due to the occupied area SA and display of the guide image 60 and the reference image 65 on the working equipment 2 in a superimposed manner. As a result, the image display systems 100 and 100a and the remote operation system 101 can display the working image 69 on the display device 52 in a form easy to see for the operator.

In the embodiment and the modification, the guide image 60 may include at least the first image IMC. That is, the guide image 60 may not include the first straight line image 62 and the second straight line image 63. Further, the processing device 51 may change, for example, a display form of the first image IMC in the guide image 60 according to the distance between the cutting edge 8T of the bucket 8 and the work target WA. In this way, an operator can easily grasp the distance between the position of the bucket 8 and the work target WA.

In the embodiment, the processing device 51 may display at least the first image IMC and the second image 68 on the display device 52. Even in this case, an operator can easily grasp the relative positional relationship between the bucket 8 and the work spot in the work target WA when the upper turning body 3 turns, by referring to the first image IMC extending along the turning direction Rtd of the upper turning body 3. As a result, at least the first image IMC and the second image 68 are displayed on the display device 52, so that in a work machine having a turning body, a decrease in work efficiency and work accuracy is suppressed.

In the embodiment, the processing device 51 generates the working image 69 with the vehicle body coordinate system (Xm, Ym, Zm); however, the processing device 51 may generate the working image 69 with any of the global coordinate system (Xg, Yg, Zg), the imaging device coordinate system (Xc, Yc, Zc) or the coordinate system (Xd, Yd, Zd) of the distance detection device 20. When the working image 69 is generated in the global coordinate system (Xg, Yg, Zg), the GNSS antennas 21 and 22 and the position computing device 23 are necessary. When the working image 69 is generated with the vehicle body coordinate system (Xm, Ym, Zm), the imaging device coordinate system (Xc, Yc, Zc) and the coordinate system (Xd, Yd, Zd) of the distance detection device 20, the GNSS antennas 21 and 22 and the position computing device 23 are unnecessary.

In the embodiment, the occupied area SA which is the area of the working equipment 2 may not be removed from the guide image 60 and the reference image 65. Even in this case, an operator can easily grasp the relative positional relationship between the bucket 8 and the work spot in the work target WA when the upper turning body 3 turns, by the first image IMC and the second image 68 displayed on the display device 52. For this reason, in the work machine having the turning body, a decrease in work efficiency is suppressed. In addition, in the work machine having the turning body, a decrease in work accuracy is suppressed.

In the embodiment described above, a part of the excavator 1 detected by the distance detection device 20, for example, the bucket 8 is removed as described above to obtain information on the shape of the work target WA (three-dimensional topography data). However, three-dimensional topographical data acquired in the past, for example several seconds before, is stored in the storage unit 51M of the processing device 51, the processing unit 51P of the processing device 51 determines whether or not the current work target WA and the stored three-dimensional topography data are at the same position, and if the current work target WA and the stored three-dimensional topography data are at the same position, the reference image 65 or 65a may be displayed using the past three-dimensional topographical data. That is, even when there is a terrain hidden by the part of the excavator 1 as seen from the imaging device 19, if there is past three-dimensional topography data, the processing device 51 can display the reference image 65 or 65a.

<Example of Image Display in Loading Operation>

In the embodiment and the modification, an example of image display by the image display systems 100 and 100a in a loading operation in which the excavator 1 loads loads such as rocks and earth and sand into a vessel of a dump truck will be described. The processing device 51 of the image display systems 100 and 100a acquires the position of the dump truck, which is a target of the loading operation, detected by the distance detection device 20. Since the first image IMC and the reference image 65 or 65a included in the working image 69 rise at the position of the dump truck, an operator can grasp the relationship between the working equipment 2 and the height and position of the dump truck. By adding the position of the dump truck to the working image 69, an operator can grasp at which position the bucket 8 reaches the dump truck when turning the upper turning body 3 and bringing the bucket 8 of the working equipment 2 closer to the dump truck. Therefore, interference between the working equipment 2 and the dump truck is suppressed.

The processing device 51 may treat the position of the dump truck detected by the distance detection device 20 as a part of the work target WA, and may acquire the position of the dump truck from a management server or the like via the communication device 25 illustrated in FIG. 2. In the latter case, the processing device 51 may apply the information on the model of the dump truck to the position of the acquired dump truck as the position of the dump truck.

The processing device 51 compares the height of the dump truck with the height of the working equipment 2, specifically the height of the cutting edge 8T of the bucket 8, and may change the display form of the first image IMC based on the comparison result. By such processing, an operator can grasp the relationship between the height of the working equipment 2 and the height of the dump truck, so that interference between the working equipment 2 and the dump truck is suppressed. When changing the display form of the first image IMC, for example, if the height of the working equipment 2 is lower than the height of the dump truck, the processing device 51 can display the first image IMC in red, if the height of the dump truck and the height of the working equipment 2 are equal to each other, the processing device 51 can display the first image IMC in orange, and if the height of the working equipment 2 is higher than the height of the dump truck, the processing device 51 can display the first image IMC in green.

When at least one of the third image 61, the first straight line image 62, and the second straight line image 63 is displayed together with the first image IMC, the processing device 51 may change at least one of the third image 61, the first straight line image 62, and the second straight line image 63 together with the first image IMC according to the height of the dump truck. By such processing, an operator can easily grasp the relationship between the height of the working equipment 2 and the height of the dump truck.

In the embodiment and the modification, as long as the work machine has the turning body having the working equipment 2, the type of the working equipment 2 and the type of the work machine are not limited.

Although the embodiment and modification have been described above, the embodiment is not limited by the contents described above. In addition, the above-mentioned components include those which can be easily assumed by those skilled in the art, substantially the same one, and so-called equivalents. Further, the above-described components can be appropriately combined. Furthermore, it is possible to perform at least one of various omission, substitution, and change of constituent elements without departing from the gist of the embodiment and modification.

REFERENCE SIGNS LIST

1 EXCAVATOR
1B VEHICLE BODY
1S, 1Sa CONTROL SYSTEM
2 WORKING EQUIPMENT
3 UPPER TURNING BODY
8 BUCKET
8B BLADE
8T CUTTING EDGE
19 IMAGING DEVICE
20 DISTANCE DETECTION DEVICE
23 POSITION COMPUTING DEVICE
50 FACILITY
51 PROCESSING DEVICE
51IO INPUT/OUTPUT UNIT
51M STORAGE UNIT
51P PROCESSING UNIT
52, 52a DISPLAY DEVICE
60 GUIDE IMAGE
61 THIRD IMAGE
62 FIRST STRAIGHT LINE IMAGE
63 SECOND STRAIGHT LINE IMAGE
65, 65a REFERENCE IMAGE
68 SECOND IMAGE
69 WORKING IMAGE
100, 100a IMAGE DISPLAY SYSTEM FOR WORK MACHINE (IMAGE DISPLAY SYSTEM)
101 REMOTE OPERATION SYSTEM OF WORK MACHINE (REMOTE OPERATION SYSTEM)
CL SECOND LINE IMAGE
RL FIRST LINE IMAGE
FG FRONT WINDOW
IMC FIRST IMAGE
Rtd TURNING DIRECTION
WA WORK TARGET
WAS SURFACE
Wb WIDTH DIRECTION

The invention claimed is:

1. An image display system for a work machine applied to the work machine including working equipment having a working tool and a turning body to which the working equipment is attached, the image display system comprising:
a position detection unit configured to detect a position of the working equipment;
a distance detection device attached to the work machine and configured to obtain information on a distance from the work machine to a work target; and
a processing device configured to generate a first image by using information on a position of the working tool obtained by the position detection unit, and information on a three-dimensional shape of the work target obtained from the information on the distance obtained by the distance detection device and causes a display device to display the first image, wherein
the first image is generated based on information on a first position corresponding to the working tool on a surface of the work target opposed to the work tool and information on a position of a portion extending from the first position along a turning direction of the turning body,
the first image indicates the position of a cutting edge of the working tool on the work target, and indicates the position of the cutting edge on the surface of the work target when the turning body turns while the working equipment maintains the current attitude,
wherein the processing device obtains a position of an intersecting portion where a circular arc, whose radius is the distance from the rotation center axis of the turning body in a three-dimensional coordinate system with reference to the work machine including the working tool, is projected on the surface of the work target in the direction parallel to the rotation center axis of the turning body and a line connecting two points along a surface of a work target is projected on the surface of the work target, with the line being perpendicular to two lines extending from the working tool to the surface of the work target and connecting the two points where the two lines extending from the working tool intersect the surface of the work target, and the processing device generates the first image using the information on the position of the intersecting portion.

2. The image display system for a work machine according to claim 1, wherein the first image is an image of an arc whose radius is a distance between the turning center axis of the turning body and the working tool as seen from a direction of the turning center axis and whose center is a position corresponding to the turning center axis.

3. The image display system for a work machine according to claim 1, wherein the processing device generates a line image along the surface of the work target by using the information on the position of the work target, combines the line image with an image of the work target, and displays the combined image on the display device.

4. The image display system for a work machine according to claim 1, comprising:

an imaging device attached to the turning body, wherein the processing device combines the first image and a second image that is an image of the work target imaged by the imaging device and displays the combined image on the display device.

5. The image display system for a work machine according to claim 4, wherein the imaging device, the position detection unit and the distance detection device are provided in the work machine, and the processing device and the display device are provided in a facility including an operation device that remotely operates the work machine.

6. The image display system for a work machine according to claim 1, wherein the processing device causes the display device to display the first image, a first straight line image which is an image of a first straight line and a second straight line image which is an image of a second straight line, as a guide image, the first straight line is a straight line extended to the surface of the work target along a direction parallel to a turning center axis of the turning body from a position outside a blade on one end side in the width direction of the working tool, and the second straight line is a straight line extended to the surface of the work target along a direction parallel to the turning center axis of the turning body from a position outside the blade on the other end side in the width direction of the working tool.

7. An image display system for a work machine applied to a work machine including working equipment having a working tool, a turning body to which the work equipment is attached, a position detection unit that detects a position of the working equipment, a distance detection device, and an imaging device, the image display system comprising:

a display device; and a processing device configured to generate a first image by using information on a position of the working tool obtained by the position detection unit, and information on a three-dimensional shape of a work target obtained from information on a distance which is obtained by the distance detection device attached to the work machine and which is from the work machine to the work target, and combines the first image with a second image that is an image of the work target imaged by the imaging device, and causes the display device to display the combined image, wherein the first image is generated based on information on a first position corresponding to the working tool on a surface of the work target opposed to the work tool and information on a position of a portion extending from the first position along a turning direction of the turning body, wherein the processing device obtains a position of an intersecting portion where a circular arc, whose radius is the distance from the rotation center axis of the turning body in a three-dimensional coordinate system with reference to the work machine including the working tool, is projected on the surface of the work target in the direction parallel to the rotation center axis of the turning body and a line connecting two points along a surface of a work target is projected on the surface of the work target, with the line being perpendicular to two lines extending from the working tool to the surface of the work target and connecting the two points where the two lines extending from the working tool intersect the surface of the work target, and the processing device generates the first image using the information on the position of the intersecting portion.

8. An image display system for a work machine applied to the work machine including working equipment having a working tool and a turning body to which the working equipment is attached, the image display system comprising:

a position detection unit configured to detect a position of the working equipment;

a distance detection device attached to the work machine and configured to obtain information on a distance from the work machine to a work target;

a processing device configured to generate a first image by using information on a position of the working tool obtained by the position detection unit, and information on a three-dimensional shape of the work target obtained from the information on the distance obtained by the distance detection device, and causes a display device to display the first image; and an imaging device attached to the turning body, wherein the first image is generated based on information on a first position corresponding to the working tool on a surface of the work target opposed to the work tool and information on a position of a portion extending from the first position along a turning direction of the turning body, the first image indicates the position of a cutting edge of the working tool on the work target, and indicates the position of the cutting edge on the surface of the work target when the turning body turns while the working equipment maintains the current attitude, the processing device generates a line image along the surface of the work target by using the information on the position of the work target, combines the line image with an image of the work target, and displays the combined image on the display device, the processing device combines the first image and a second image that is an image of the work target imaged by the imaging device and causes the display device to display the combined image, the processing device obtains an area occupied by the working equipment in the second image using an attitude of the working equipment, and removes the obtained area from information on a shape of the work target, and
the line image includes a plurality of first line images radially extending from a position corresponding to a turning center axis of the turning body, and a plurality of second line images extending along a turning direction of the turning body around the turning center axis,
wherein the processing device obtains a position of an intersecting portion where a circular arc, whose radius is the distance from the rotation center axis of the turning body in a three-dimensional coordinate system with reference to the work machine including the working tool, is projected on the surface of the work target in the direction parallel to the rotation center axis of the turning body and a line connecting two points along a surface of a work target is projected on the surface of the work target, with the line being perpendicular to two lines extending from the working tool to the surface of the work target and connecting the two points where the two lines extending from the working tool intersect the surface of the work target, and
the processing device generates the first image using the information on the position of the intersecting portion.

* * * * *